United States Patent [19]
Ishihara et al.

[11] Patent Number: 5,749,008
[45] Date of Patent: May 5, 1998

[54] EYEPIECE

[75] Inventors: Jun Ishihara, Kobe; Kyoko Yamaguchi, Sakai, both of Japan

[73] Assignee: Minolta, Osaka, Japan

[21] Appl. No.: 784,426

[22] Filed: Jan. 16, 1997

[30] Foreign Application Priority Data

Jan. 18, 1996 [JP] Japan ................................ 8-006731
Jan. 18, 1996 [JP] Japan ................................ 8-006734

[51] Int. Cl.$^6$ .................................. G03B 13/06; G03B 13/02
[52] U.S. Cl. ........................ 396/373; 396/382; 359/422; 359/432
[58] Field of Search .............................. 396/373, 378, 396/382, 383; 359/432, 422, 431

[56] References Cited

U.S. PATENT DOCUMENTS

| | | |
|---|---|---|
| 4,206,988 | 6/1980 | Miyamoto et al. ............ 396/384 |
| 4,217,048 | 8/1980 | Egawa ............................. 396/382 |
| 4,664,485 | 5/1987 | Momiyama et al. . |
| 4,906,078 | 3/1990 | Inabata et al. ................. 350/423 |
| 5,086,353 | 2/1992 | Mukai et al. ................... 359/432 |
| 5,257,129 | 10/1993 | Morooka et al. ............. 359/432 |
| 5,410,430 | 4/1995 | Ito et al. ........................ 359/422 |
| 5,550,674 | 8/1996 | Abe et al. ...................... 359/422 |
| 5,621,568 | 4/1997 | Hasushita et al. ............ 359/432 |
| 5,625,486 | 4/1997 | Mori et al. .................... 359/431 |
| 5,625,487 | 4/1997 | Hasushita et al. ............ 359/432 |

*Primary Examiner*—Russell E. Adams
*Attorney, Agent, or Firm*—Price, Gess & Ubell

[57] ABSTRACT

An eyepiece for use in a viewfinder optical system has a wide dioptric power adjustment range. The eyepiece is provided with, from a side of a secondary-image plane formed by a first, a second, and a third relay lens, a first, a second, and a third eyepiece lens having a positive, a negative, and a positive refractive power, respectively. For dioptric power adjustment, the positive first eyepiece lens or the negative second eyepiece lens is moved in an optical axis direction.

35 Claims, 28 Drawing Sheets

I1  G1 G2 A G3  I2 G4 G5 G6 AX E

G4 G5 G6

G4 G5 G6

I1  G1 G2 G3  I2  G4 G5  AX E

G4  G5

G4  G5

I1  G1 G2 G3  I2  G4  G5 G6  AX  E
    A

G4  G5 G6

G4  G5 G6

I1　G1 G2 G3　I2　G4 G5 G6　AX　E
　　　A

G4　G5　G6

G4　G5　G6

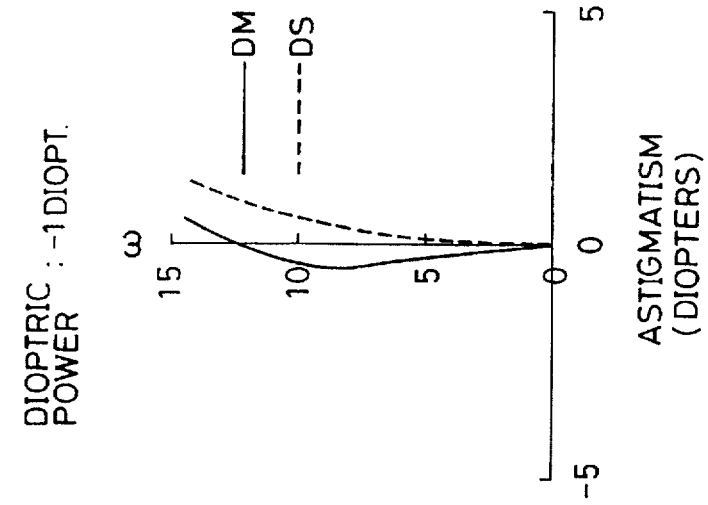
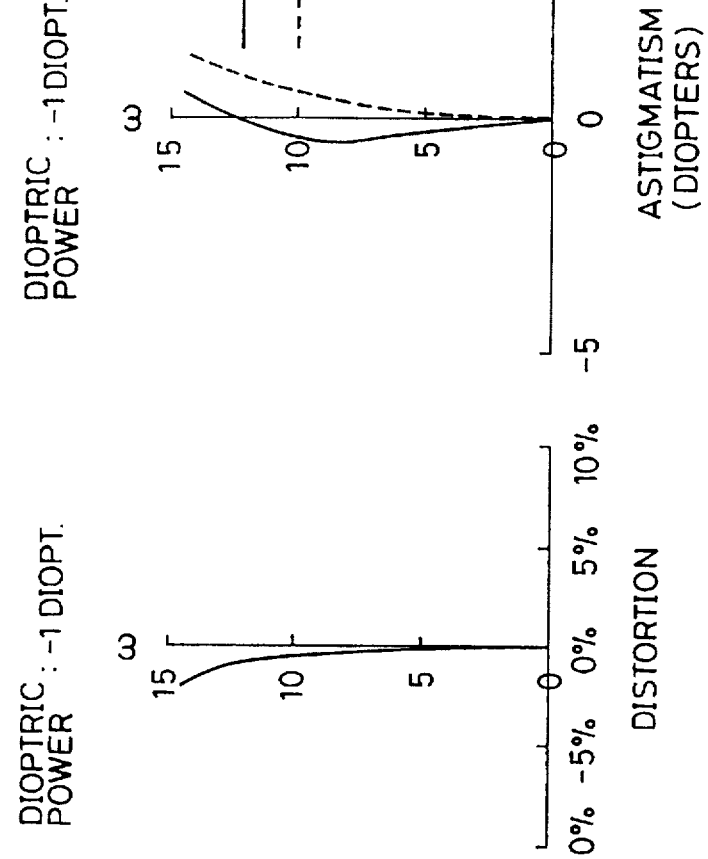
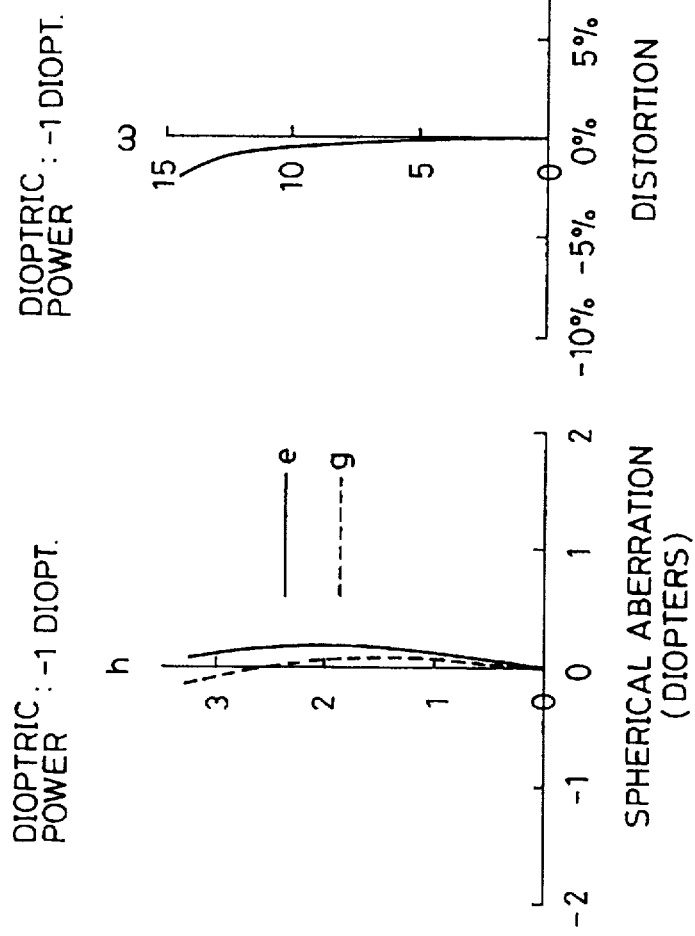

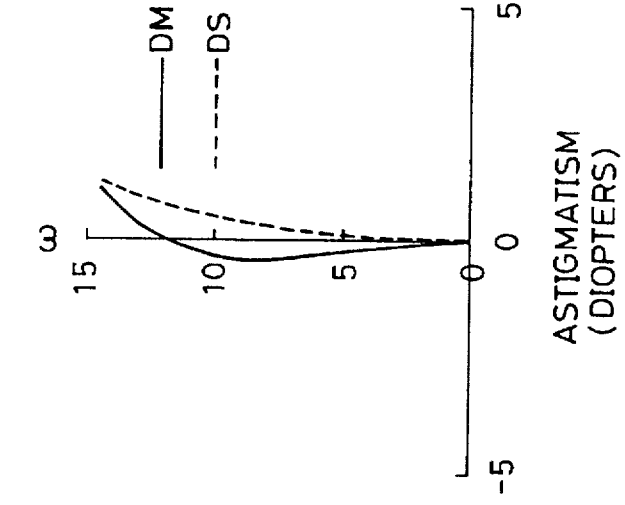
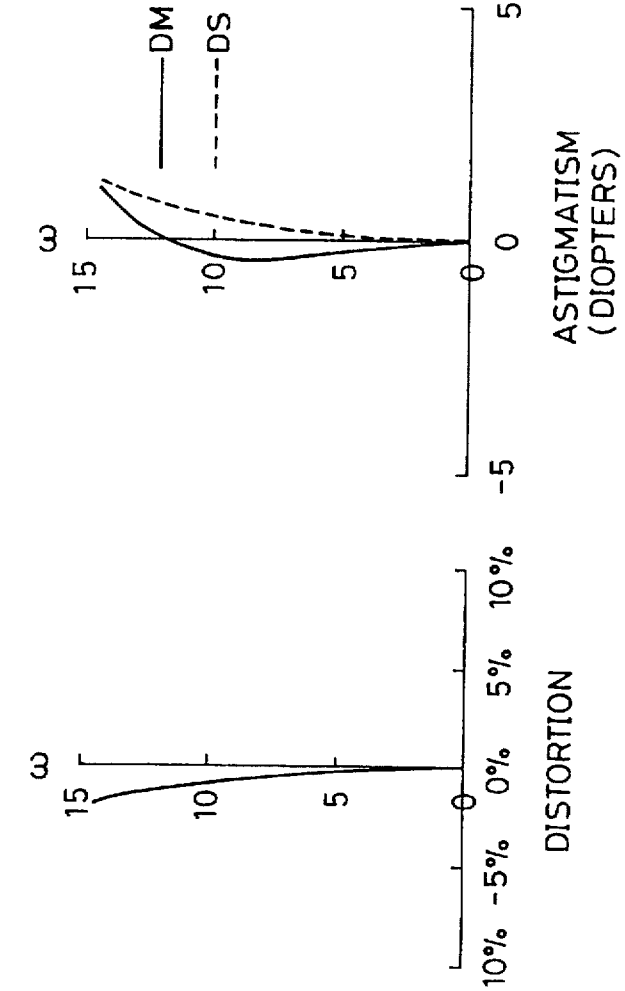
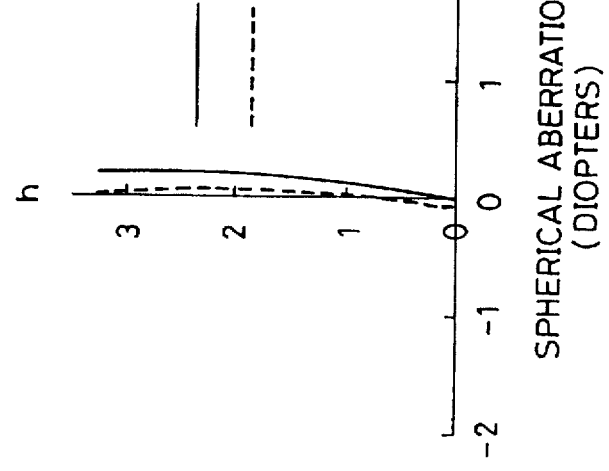

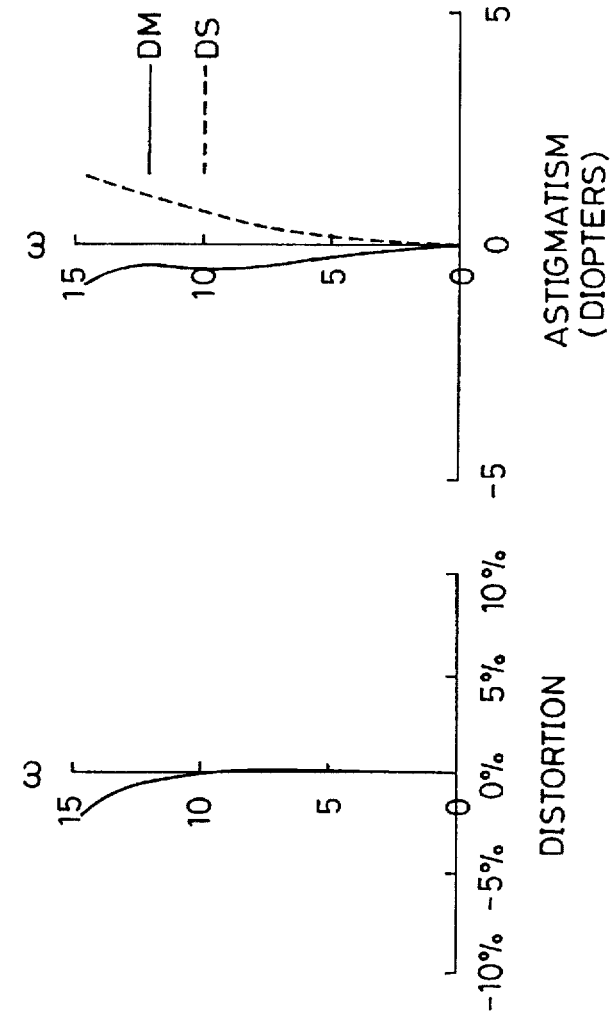
FIG. 8G  FIG. 8H  FIG. 8I
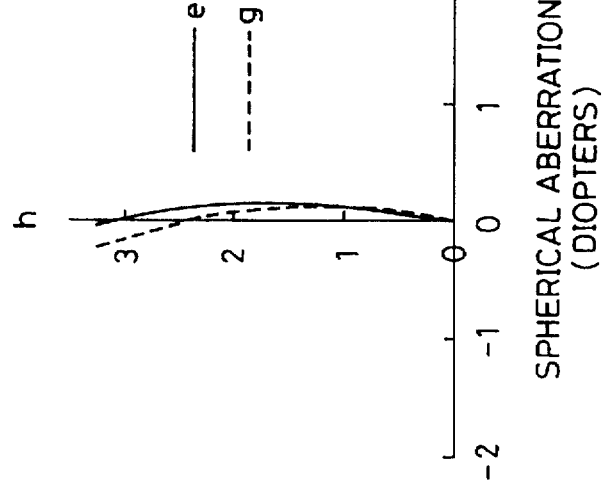

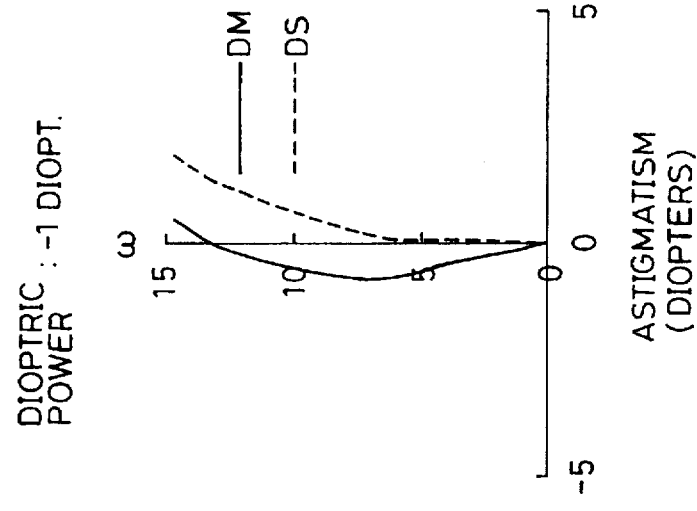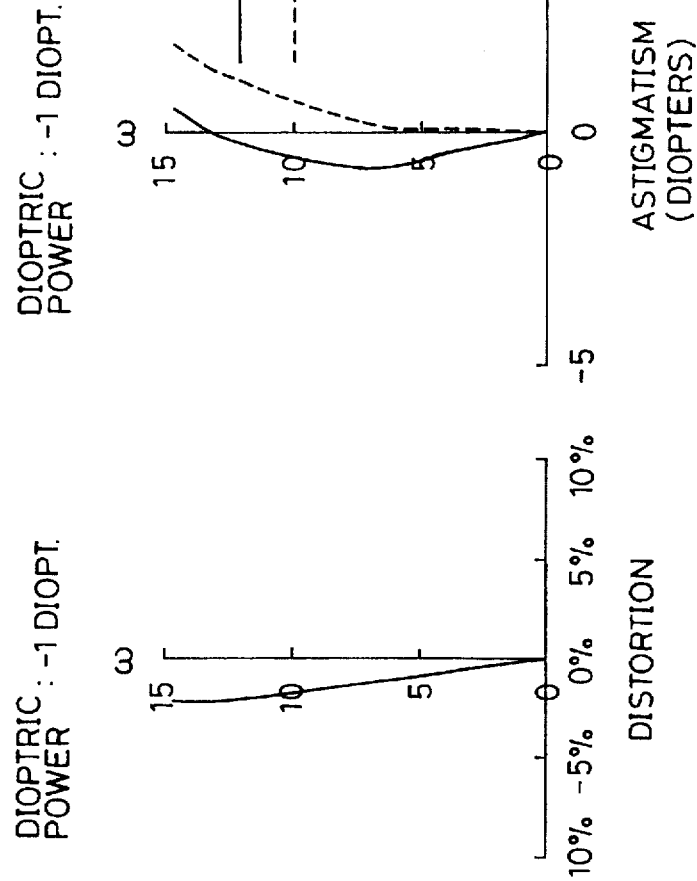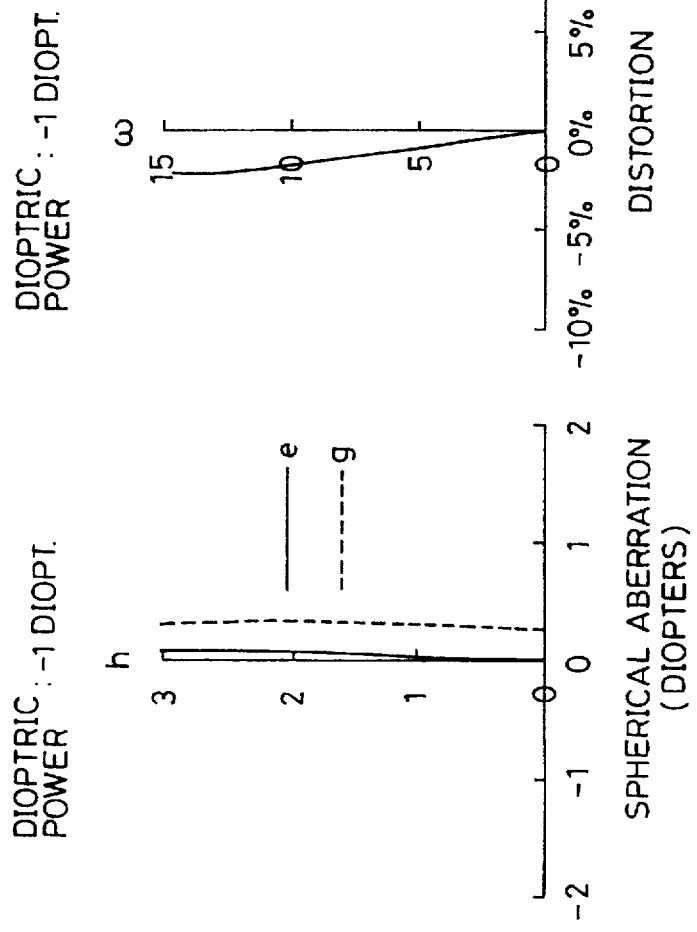

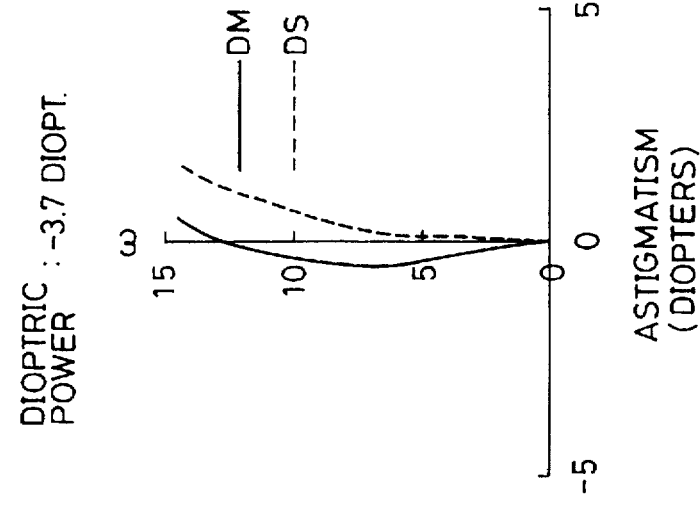
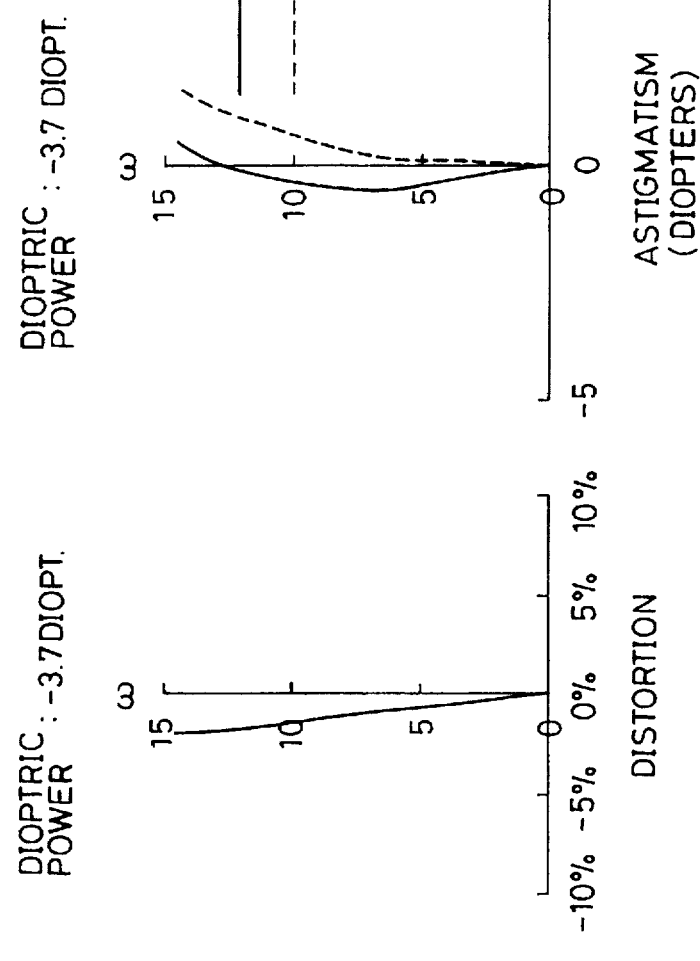
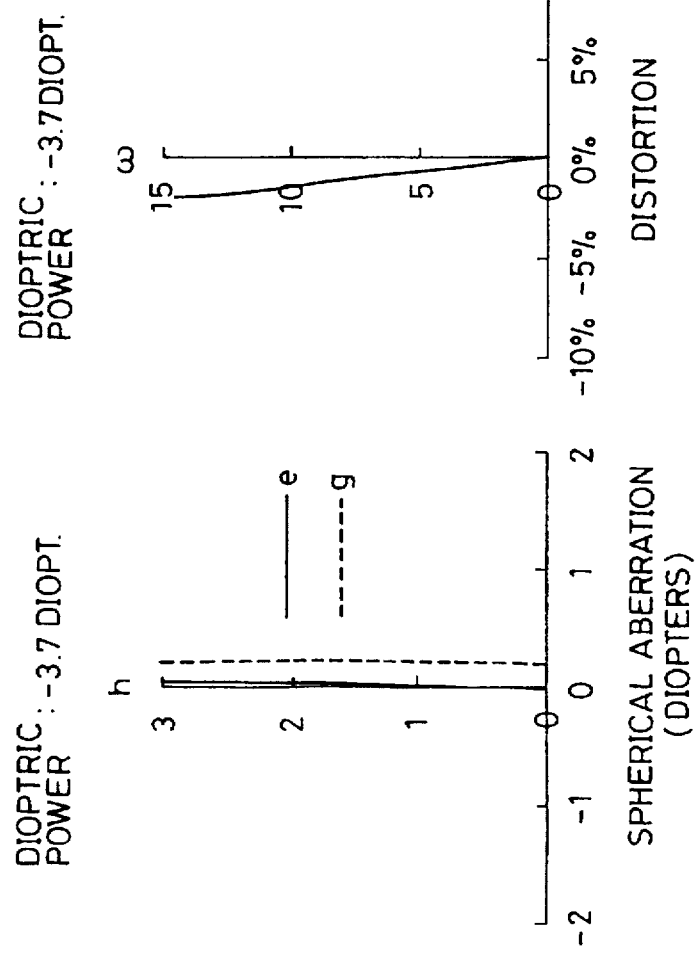

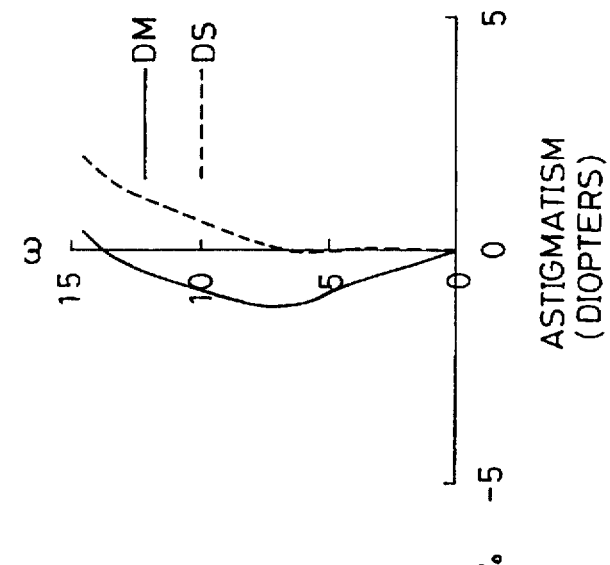
FIG. 9G
FIG. 9H
FIG. 9I
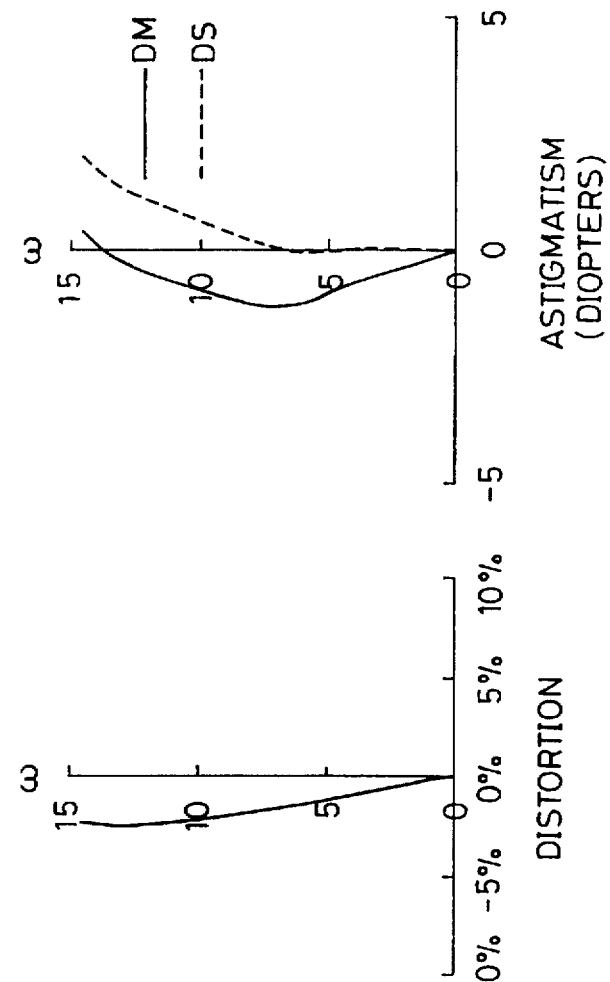
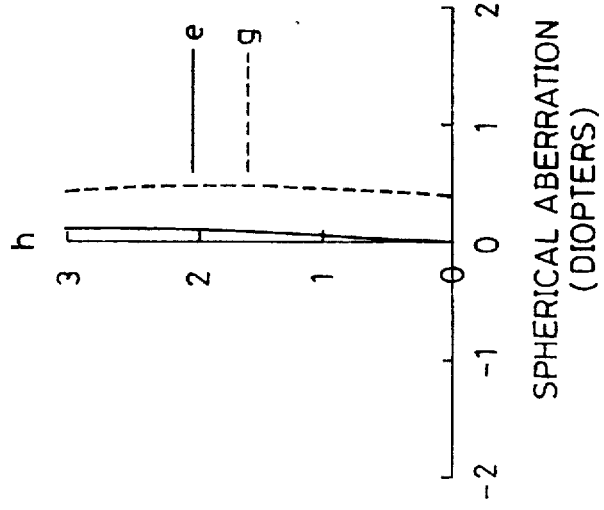

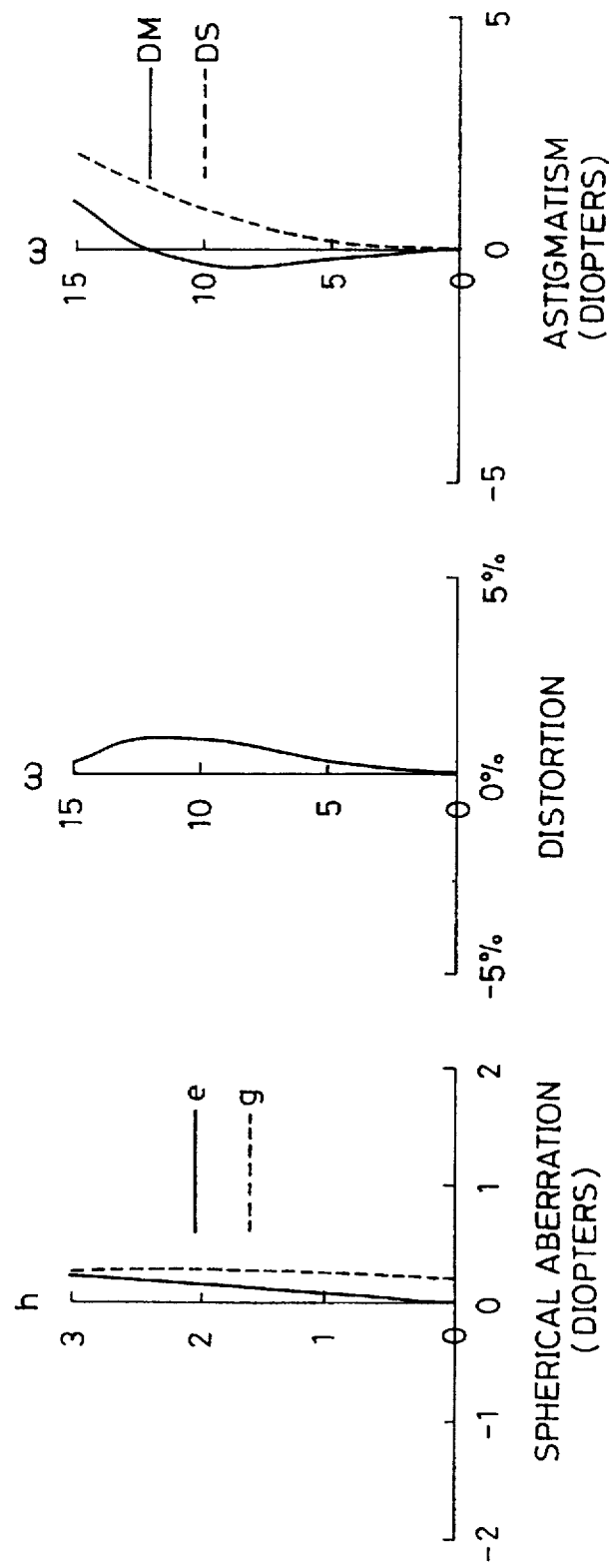

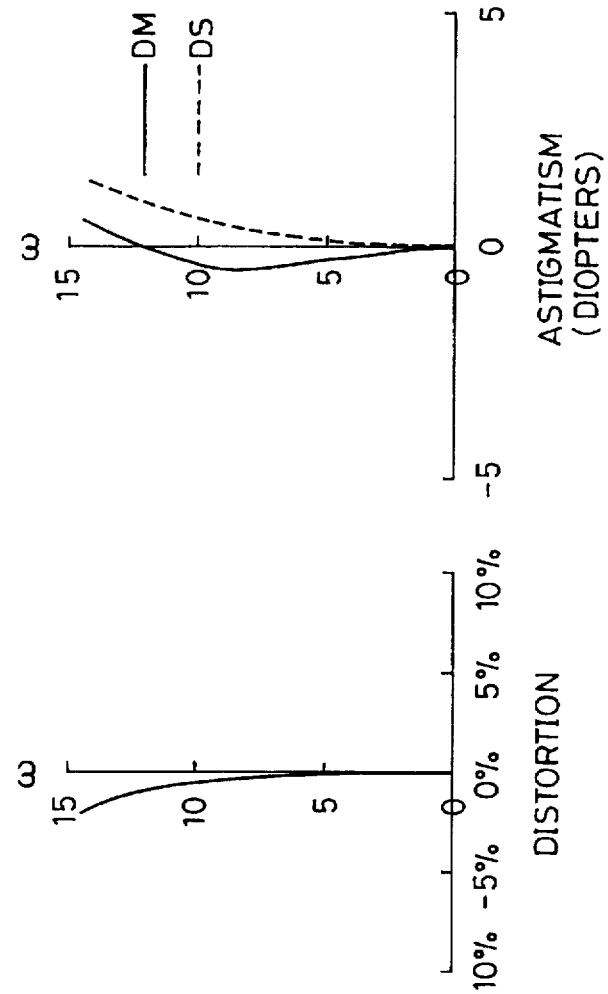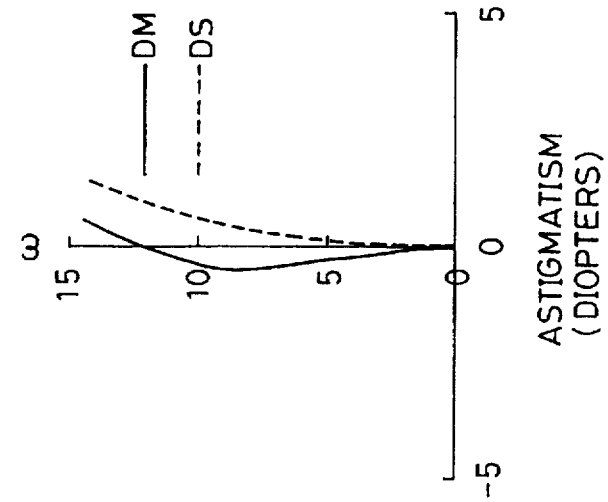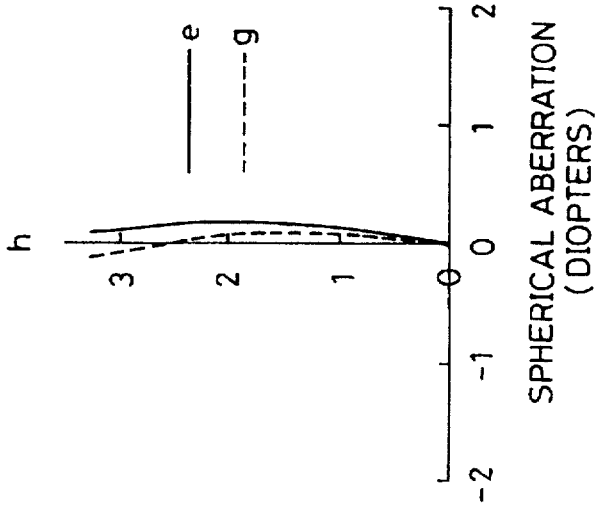

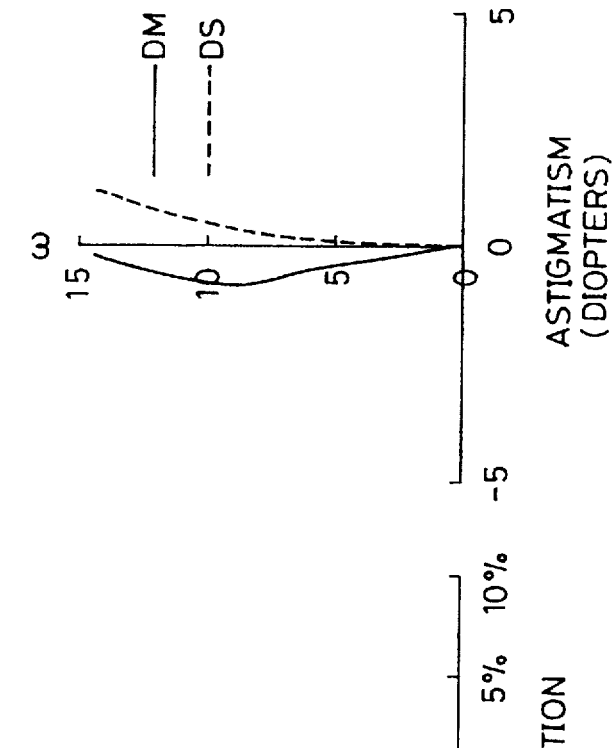
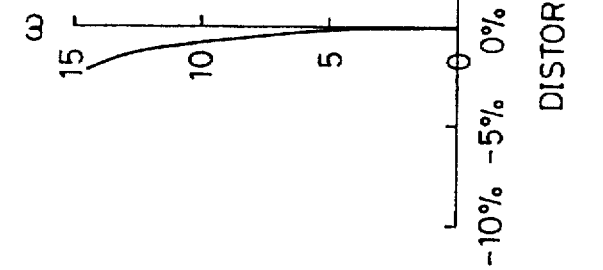
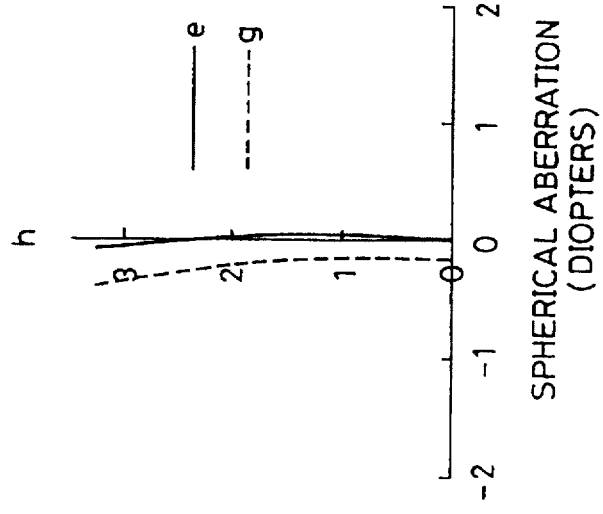

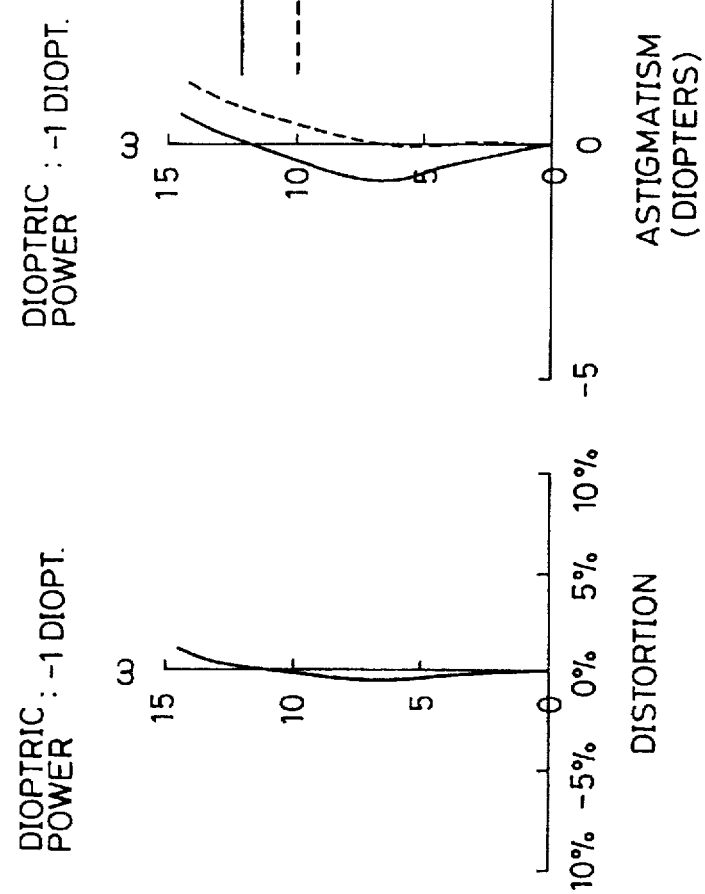
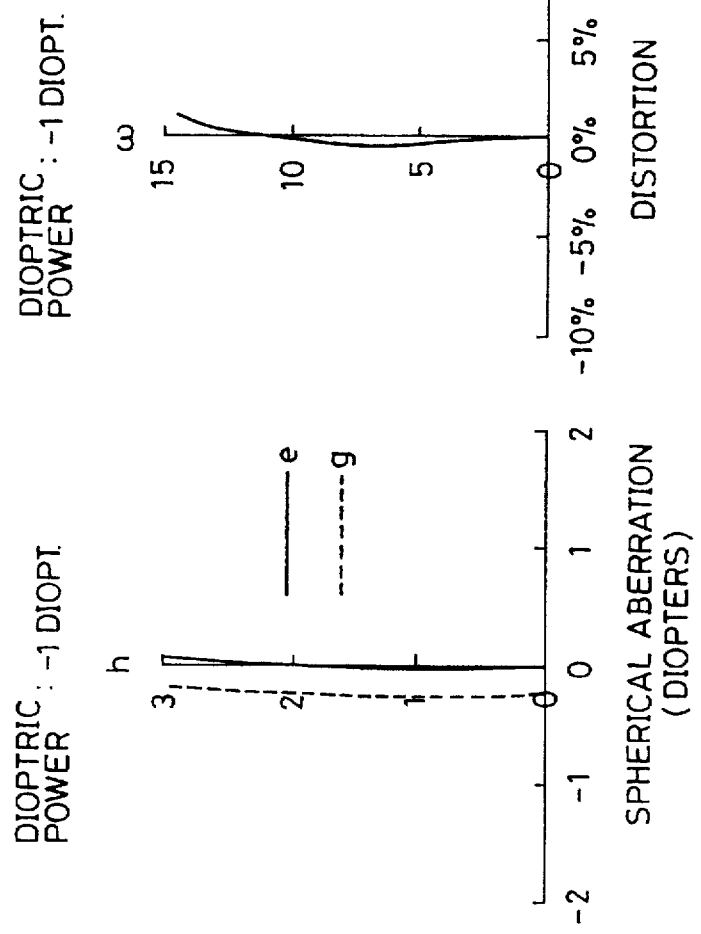

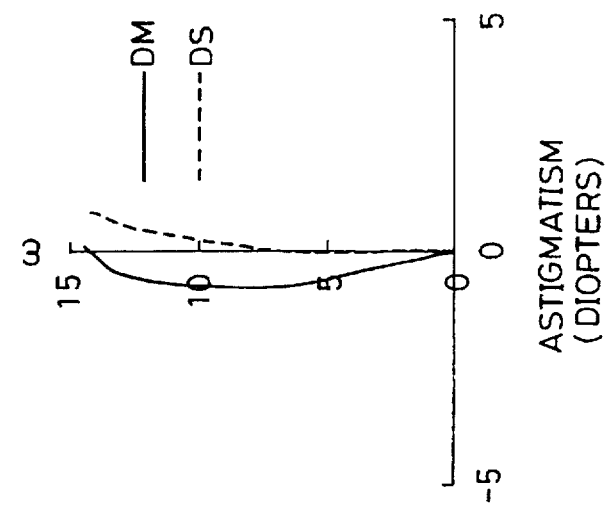
FIG. 13D FIG. 13E FIG. 13F
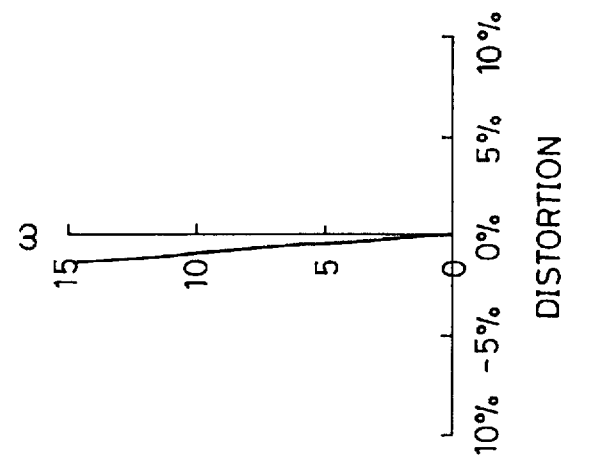
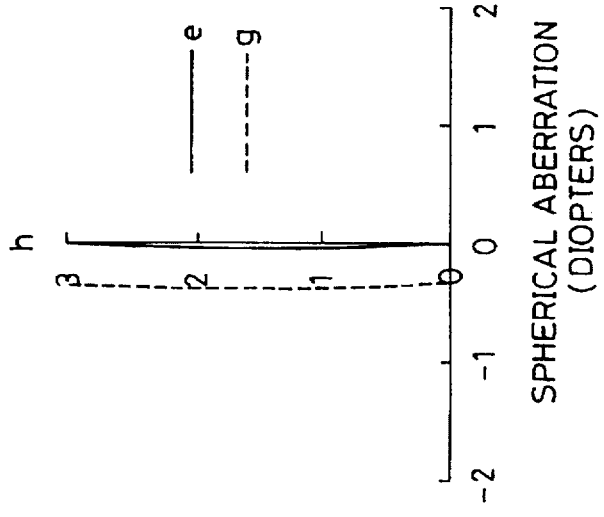

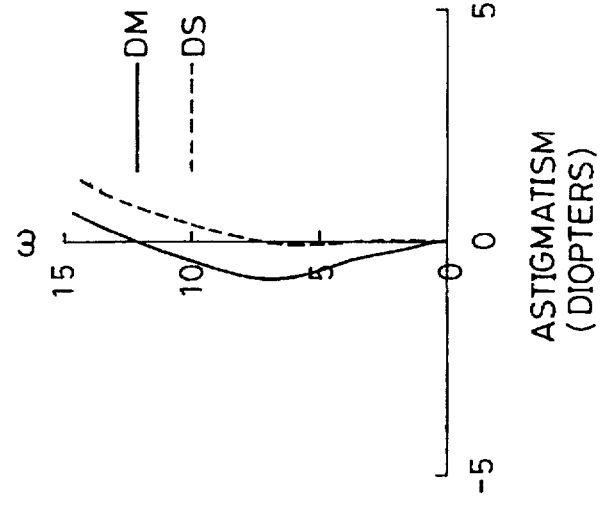
FIG. 14A  FIG. 14B  FIG. 14C
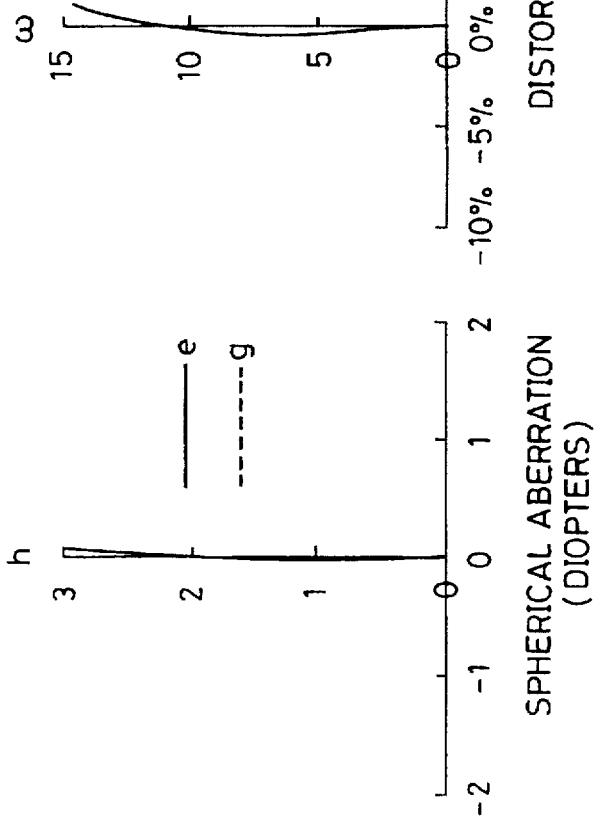

EYEPIECE

BACKGROUND OF THE INVENTION

1. Field of the Invention

The present invention relates to an eyepiece for use as a viewfinder optical system, for example, in a lens-shutter camera.

2. Description of the Prior Art

Conventionally, eyepieces with adjustable dioptric power have been used as viewfinder optical systems. For example, Japanese Laid-open Patent Application No. S61-19968 proposes an eyepiece for use as a viewfinder in a single-reflex camera. This eyepiece consists of three lens units, i.e. a positive, a negative, and a positive lens unit, and is so constructed that the dioptric power is adjusted by moving the negative second lens unit.

However, the above conventional eyepiece provides only a narrow range of dioptric power adjustment. Therefore, even though its dioptric power is adjustable, the conventional eyepiece does not allow dioptric power adjustment in a range wide enough for most users.

SUMMARY OF THE INVENTION

An object of the present invention is to provide an eyepiece having a wide dioptric power adjustment range for use as a viewfinder optical system.

To achieve the above object, according to one aspect of the present invention, an eyepiece for use in a viewfinder optical system is provided with a relay lens system and comprises, from a side of an image plane formed by the relay lens system, a first lens unit having a positive refractive power and moved in an optical axis direction for dioptric power adjustment, and other lens units.

According to another feature of the present invention, an eyepiece for use in a viewfinder optical system is provided with a relay lens system and comprises, from a side of an image plane formed by the relay lens system, a first lens unit having a positive refractive power, and a second lens unit of which part of lens units are moved in an optical axis direction for dioptric power adjustment.

BRIEF DESCRIPTION OF THE DRAWINGS

This and other objects and features of this invention will become clear from the following description, taken in conjunction with the preferred embodiments with reference to the accompanied drawings in which:

FIGS. 8A to 8I are aberration diagrams of the first embodiment;

FIGS. 9A to 9I are aberration diagrams of the second embodiment;

FIGS. 10A to 10I are aberration diagrams of the third embodiment;

FIGS. 12A to 12I are aberration diagrams of the fifth embodiment;

FIGS. 13A to 13I are aberration diagrams of the sixth embodiment; and

FIGS. 14A to 14I are aberration diagrams of the seventh embodiment.

DESCRIPTION OF THE PREFERRED EMBODIMENTS

Hereinafter, eyepieces embodying the present invention will be described with reference to the drawings. FIGS. 1A, 1B, and 1C to 7A, 7B, and 7C are optical path diagrams of viewfinder optical systems employing an eyepiece of a first to a seventh embodiment, respectively, of the present invention. In these viewfinder optical systems, a primary image on a focal plane I1 is re-imaged on a secondary-image plane I2 through a first relay lens G1 composed of a biconvex lens, a second relay lens G2 composed of a biconcave lens, an aperture diaphragm A, and a third relay lens G3 composed of a biconvex lens. The focal plane I1 is a primary-image plane on which an image is formed by an objective lens (not shown in the figures), and at the focal plane I1 is disposed a focusing screen.

Figure 1A:
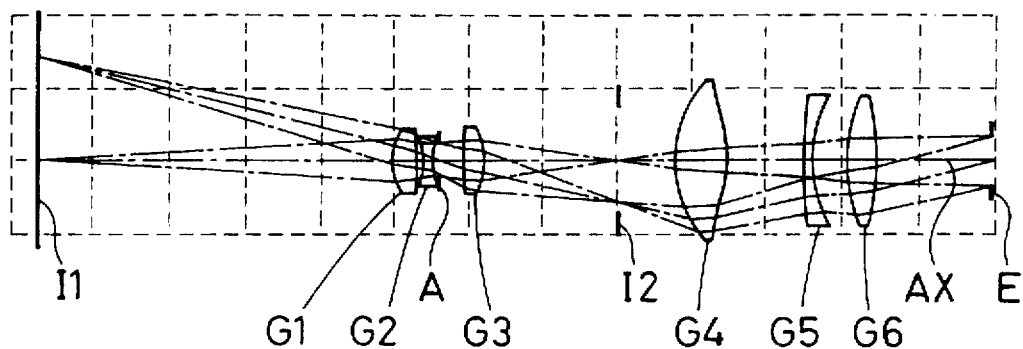
FIGS. 1A to 1C are optical path diagrams of a viewfinder optical system provided with an eyepiece of a first embodiment of the present invention.
Figure 1B:
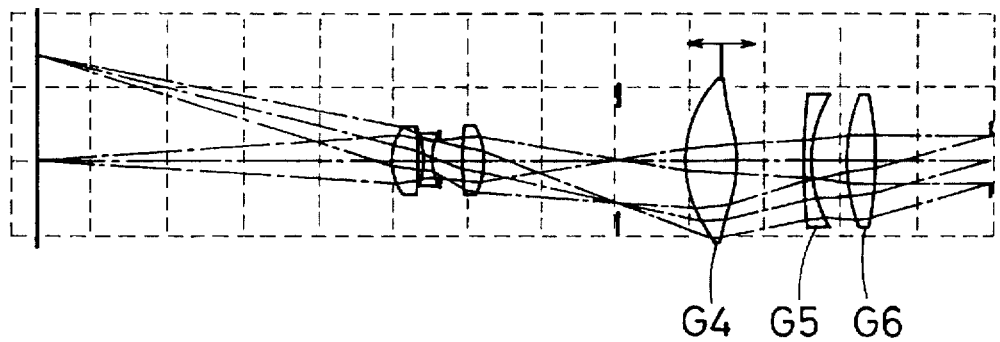
Figure 1C:
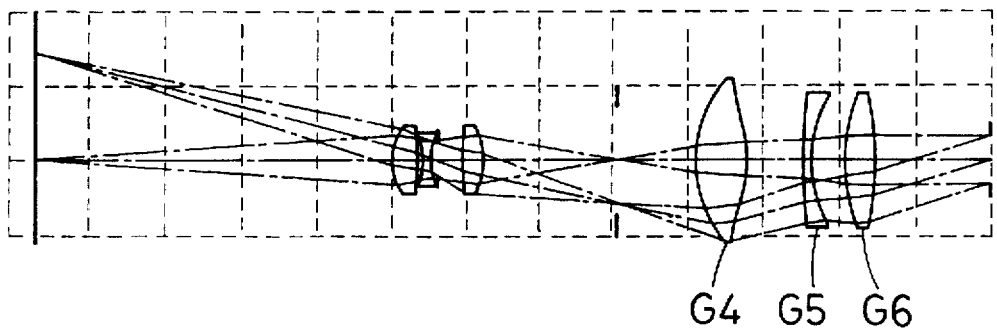

The first embodiment, which is of a positive-negative-positive type, is designed to be an eyepiece for directing light from the above-mentioned secondary-image plane I2 to the pupil E. Specifically, the first embodiment is constituted of, from the secondary-image plane I2 side, a first eyepiece lens G4 composed of a biconvex lens, a second eyepiece lens G5 composed of a negative meniscus lens with its concave surface facing toward the pupil E side (with its convex surface facing toward the secondary-image plane I2 side), and a third eyepiece lens G6 composed of a biconvex lens. Moreover, as shown in FIGS. 1A to 1C, the first embodiment is so constructed that the dioptric power can be adjusted by moving the front-side positive first eyepiece lens G4 (as a first lens unit) along the optical axis AX.

Figure 2A:
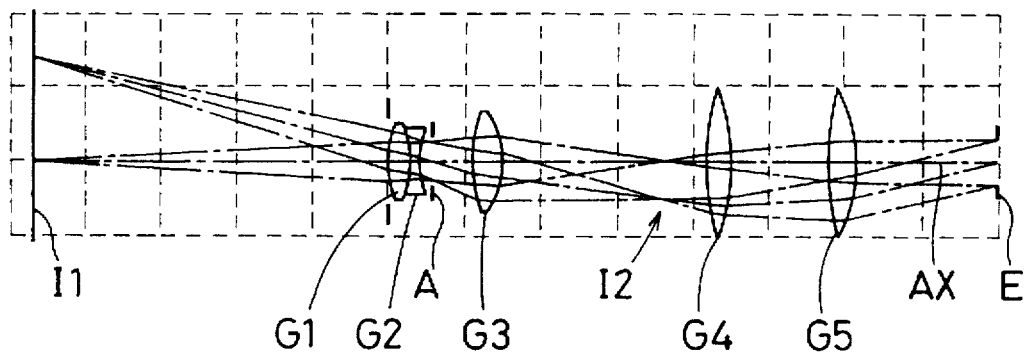
FIGS. 2A to 2C are optical path diagrams of a viewfinder optical system provided with an eyepiece of a second embodiment of the present invention.
Figure 2B:
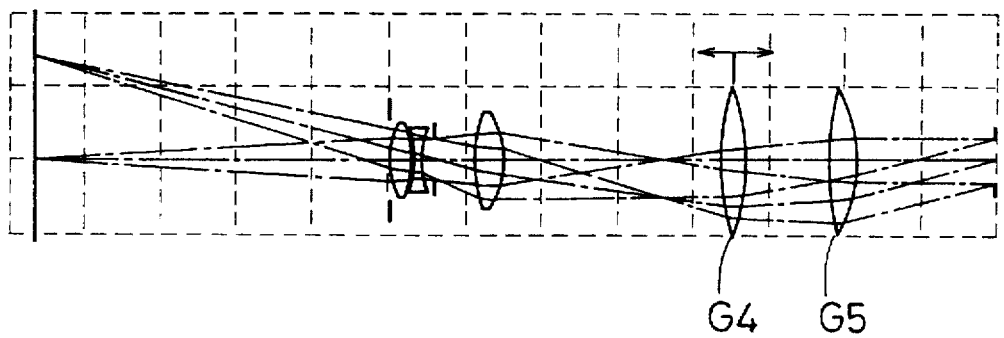
Figure 2C:
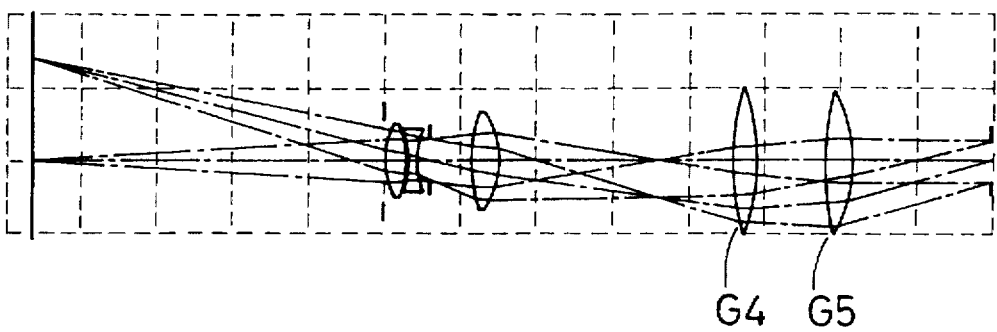
Figure 3A:
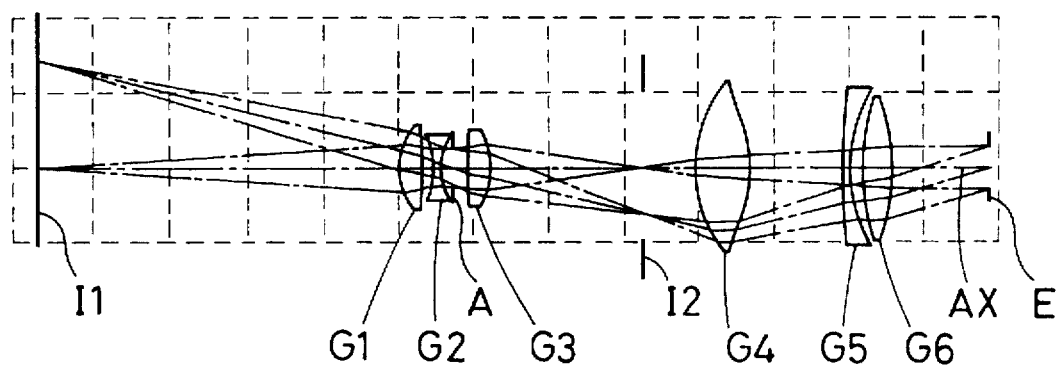
FIGS. 3A to 3C are optical path diagrams of a viewfinder optical system provided with an eyepiece of a third embodiment of the present invention.
Figure 3B:
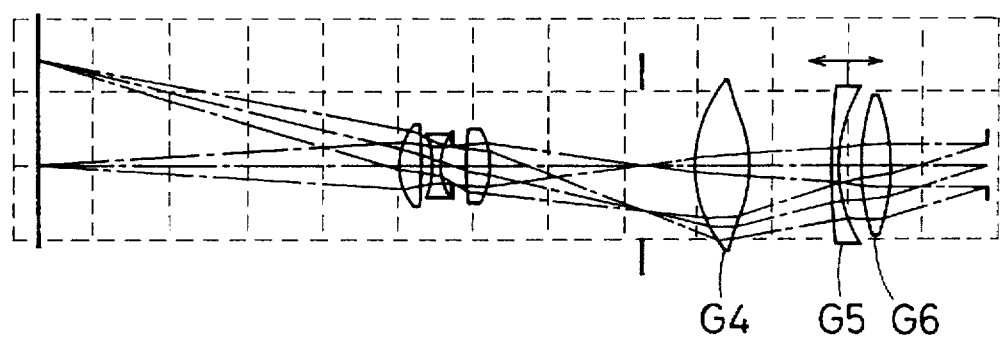
Figure 3C:
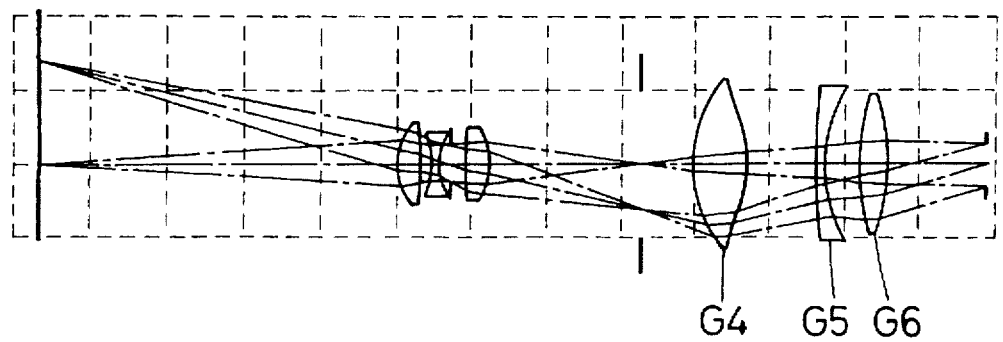
Figure 4A:
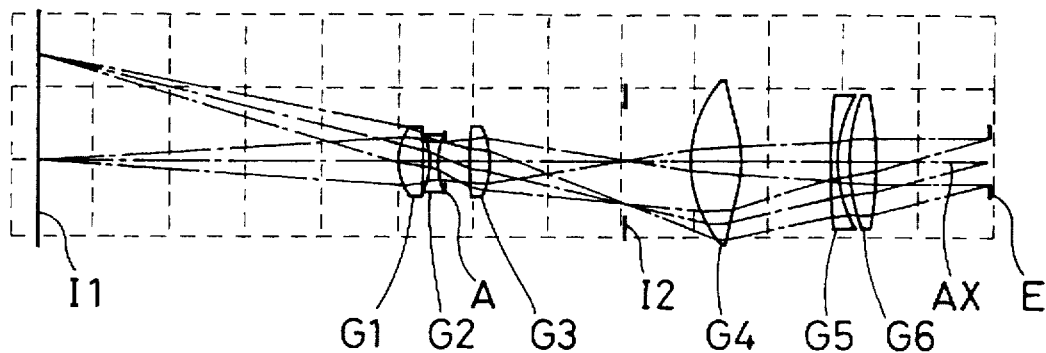
FIGS. 4A to 4C are optical path diagrams of a viewfinder optical system provided with an eyepiece of a fourth embodiment of the present invention.
Figure 4B:
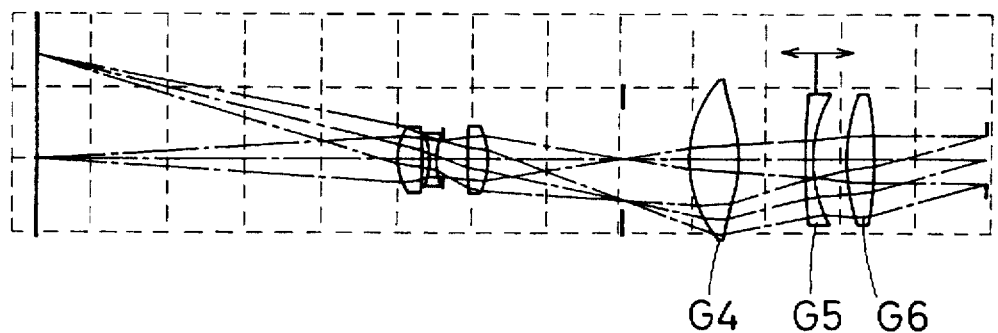
Figure 4C:
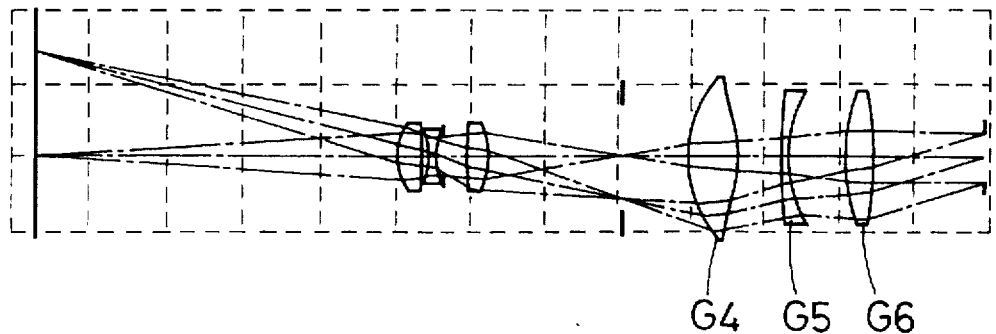

The second embodiment, which is of a positive-positive type, is designed to be an eyepiece for directing light from the above-mentioned secondary-image plane I2 to the pupil E. Specifically, the second embodiment is constituted of, from the secondary-image plane I2 side, a first eyepiece lens G4 and a second eyepiece lens G5, each composed of a biconvex lens. Moreover, as shown in FIGS. 2A to 2C, the second embodiment is so constructed that the dioptric power can be adjusted by moving the front-side positive first eyepiece lens G4 (as a first lens unit) along the optical axis AX.

The third to fifth embodiments, which are of a positive-negative-positive type, are designed to be an eyepiece for directing light from the above-mentioned secondary-image plane I2 to the pupil E. Specifically, the third to fifth embodiments are constituted of, from the secondary-image plane I2 side, a first eyepiece lens G4 composed of a biconvex lens, a second eyepiece lens G5 composed of a negative meniscus lens with its concave surface facing toward the pupil E side (with its convex surface facing toward the secondary-image plane I2 side), and a third eyepiece lens G6 composed of a biconvex lens.

The sixth and seventh embodiments, which are of a positive-positive-negative type, are designed to be an eyepiece for directing light from the above-mentioned secondary-image plane I2 to the pupil E. Specifically, the sixth and seventh embodiments are constituted of, from the secondary-image plane I2 side, a first eyepiece lens G4 and a second eyepiece lens G5, each composed of a biconvex lens, and a third eyepiece lens G6 composed of a negative meniscus lens with its concave surface facing toward the secondary-image plane I2 side.

Moreover, as shown in FIGS. 3A to 3C, 4A to 4C, and 6A to 6C, the third, fourth, and sixth embodiments are so constructed that the dioptric power can be adjusted by moving the second eyepiece lens G5 (which is a part of the second lens unit) along the optical axis AX. By contrast, as shown in FIGS. 5A to 5C and 7A to 7C, the fifth and seventh embodiments are so constructed that the dioptric power can be adjusted by moving the third eyepiece lens G6 (which is a part of the second lens unit) along the optical axis AX.

In the viewfinder optical system that employs the first embodiment, the focal plane I1 side surface of the second relay lens G2 and the pupil E side surface of the first eyepiece lens G4 are aspherical surfaces. In the viewfinder optical system that employs the second embodiment, the focal plane I1 side surface of the second relay lens G2, the secondary-image plane I2 side surface of the third relay lens G3, the secondary-image plane I2 side surface of the first eyepiece lens G4, and the secondary-image plane I2 side surface of the second eyepiece lens G5 are aspherical surfaces.

In the viewfinder optical systems that employ the third, fourth, and fifth embodiments, the focal plane I1 side surface of the second relay lens G2 and the pupil E side surface of the first eyepiece lens G4 are aspherical surfaces. In the viewfinder optical systems that employ the sixth and seventh embodiments, the focal plane I1 side surface of the second relay lens G2, the secondary-image plane I2 side surface of the third relay lens G3, the secondary-image plane I2 side surface of the first eyepiece lens G4, the secondary-image plane I2 side surface of the second eyepiece lens G5, and the secondary-image plane I2 side surface of the third eyepiece lens G6 are aspherical surfaces.

Owing to the above constructions, the first to seventh embodiments can be suitably used in a hypercentric optical system, such as a high-magnification viewfinder provided with relay lenses, where the entrance pupil is located closer to the object than the primary-image plane I1 (focal plane) is. Moreover, the first eyepiece lens G4 functions as a condenser lens disposed away from the secondary-image plane I2. This contributes to the improvement of image plane quality (to the reduction of curvature of field, i.e. variation in the view distance in accordance with the image height), and accordingly makes it possible to adjust the dioptric power in a wider range than ever with a slight movement of the first, second, or third eyepiece lens G4, G5, or G6. This feature will be described in more detail below.

Generally, when an optical system with a strong positive power such as a relay lens is combined with another optical system with a strong positive power such as an eyepiece, it is necessary to use a condenser lens (which also has a strong positive power) to make pupils coincide. This is because, without a condenser lens, the peripheral region of the image plane is eclipsed and becomes dim. The condenser lens for making pupils coincide is usually placed near the image plane. This is because, near the image plane, the condenser lens does not much affect imaging performance, and its effective diameter can be reduced to a minimum.

In general, to reduce the size of a viewfinder optical system in which relay lenses are used as an inverting optical system, it is necessary to shorten the total length of the viewfinder optical system. To shorten the total length of a viewfinder optical system, it is at the same time necessary to shorten also the conjugate distance of the pupils of the eyepiece (the entrance and exit pupils). Furthermore, to shorten the conjugate distance of the pupils, it is necessary to increase the power of the condenser lens. As a result, all of the optical systems constituting the viewfinder optical system (i.e. the relay lenses, condenser lens, and eyepiece) are each given a strong positive power. As the power of a viewfinder optical system becomes stronger in the positive direction, its Petzval sum becomes greater in the positive direction, and this degenerates image plane quality. In short, an attempt to reduce an increasing astigmatic difference inevitably results in an increase in curvature of field, and thus results in an inclination of the image plane.

Improvement of the above-mentioned image plane quality can be most effectively achieved by optimizing power arrangement. In the first and second embodiments, the positive first eyepiece lens G4 that is moved for dioptric power adjustment also functions as a condenser lens disposed away from the secondary-image plane I2. In the third to seventh embodiments, the positive first eyepiece lens G4, which is disposed on the front side of the second or third eyepiece lens G5 or G6 that is moved for dioptric power adjustment, also functions as a condenser lens disposed away from the secondary-image plane I2. These efficient power arrangements contribute to the improvement of image plane quality. Specifically, in the first, third, fourth, and fifth embodiments, the positive first eyepiece lens G4 is given a power stronger than that of the positive third eyepiece lens G6, so that the first eyepiece lens G4 also functions as a condenser lens, whereas, in the second, sixth, and seventh embodiments, the positive first eyepiece lens G4 is given a power stronger than that of the positive second eyepiece lens G5, so that the first eyepiece lens G4 also functions as a condenser lens. In this way, the improvement of image plane quality helps to realize a wider dioptric power adjustment range than ever.

Furthermore, selecting glass materials having the most suitable refractive indices is effective in the improvement of image plane quality. Specifically, selecting a glass material having a high refractive index for convex lenses and selecting a glass material having a low refractive index for concave lenses is effective, and is especially so with lenses having strong powers. In the first to seventh embodiments where, as described above, the first eyepiece lens G4 has the strongest power, it is desirable that the first eyepiece lens G4 be made of high-refractive-index glass such as LaC8 or Nb1F (manufactured by HOYA). Furthermore, to obtain better matching of pupils, it is desirable that the first eyepiece lens G4 be an aspherical lens. The first eyepiece lens G4 may be made of plastics, because it is at present difficult to form aspherical surfaces on glass pieces at low cost.

In addition to image plane quality, chromatic aberration needs to be taken into consideration. As is well-known, it is desirable to select low-dispersion glass for convex lenses and high-dispersion glass for concave lenses.

Moreover, in the first and second embodiments, while the first eyepiece lens G4 is moved for dioptric power adjustment, the lens units that are disposed on the rear side of the first eyepiece lens G4 (i.e. the second and third eyepiece lenses G5 and G6) are not moved during dioptric power adjustment (i.e. remain in fixed positions). In the third, fourth, and sixth embodiments, while the second eyepiece lens G5 is moved for dioptric power adjustment, the lens that is disposed on the rear side of the second eyepiece lens G5 (i.e. the third eyepiece lens G6) is not moved during dioptric power adjustment (i.e. remain in fixed positions). This helps to eliminate variation in the exit pupil distance (i.e. variation in the eyepoint position) during dioptric power adjustment. The exit pupil distance refers to that distance between the rear end of the eyepiece and the pupil (eye) of an observer at which the field of view in the viewfinder can be viewed without being eclipsed. Too short an eyepoint distance is inconvenient because, for example, an observer wearing glasses cannot view the entire field of view.

The constructions described above where the rear-end surface (rear-end lens) of the eyepiece remains in a fixed position during dioptric power adjustment make it easy to work out a dustproof, waterproof, and dripproof design. By contrast, in a viewfinder with a conventional eyepiece of which all the lens units are movable (the rear-end surface of the eyepiece is movable), it is necessary to provide a protective glass piece at the rear of the eyepiece to make it dustproof, waterproof, and dripproof. Inconveniently, this not only increases the cost and causes additional flare and ghosts due to reflection between surfaces, but also makes the eyepoint distance shorter because of the thickness of the protective glass piece.

To secure a still wider dioptric power adjustment range in the constructions of the first to seventh embodiments, it is desirable that the following condition (1) be satisfied:

$$f1 < f2 \qquad (1)$$

where f1: focal length of the first eyepiece lens G4;

f2: composite focal length of the second and third eyepiece lenses G5 and G6 in the first, third, fourth, fifth, sixth, and seventh embodiments, or focal length of the second eyepiece lens G5 in the second embodiment.

In the constructions of the first to seventh embodiments, since the first eyepiece lens G4, which constitutes the first lens unit of the eyepiece lens system, is composed of a positive single lens, it is possible to reduce the cost. Moreover, in the construction of the second embodiment, the second lens unit of the eyepiece lens system is composed solely of the second eyepiece lens G5, it is possible to reduce the cost.

In the constructions of the third and fourth embodiments, where the second lens unit of the eyepiece lens system is composed of, from the image-surface side, a negative lens and a positive lens and where the negative lens is moved along the optical axis for dioptric power adjustment, it is desirable that the following condition (2) be satisfied. When condition (2) is satisfied, a still wider dioptric power adjustment range can be secured.

$$f1 < f2+ \qquad (2)$$

where f1: focal length of the first eyepiece lens G4;

f2+: focal length of the positive lens (the third eyepiece lens G6) of the second lens unit.

In the first, third, fourth, and fifth embodiments, which are of a positive-negative-positive type, it is desirable that the positive third eyepiece lens G6 satisfy the following conditions (3) and (4):

$$R_{31} < |R_{32}| \qquad (3)$$

$$R_{32} < 0 \qquad (4)$$

where $R_{31}$: curvature radius of the front-side surface of the third eyepiece lens G6;

$R_{32}$: curvature radius of the rear-side surface of the third eyepiece lens G6.

As long as conditions (3) and (4) are satisfied, various types of aberration can be suppressed satisfactorily.

Moreover, in a positive-negative-positive type eyepiece, as in the first, third, fourth, and fifth embodiments, it is desirable that the negative second eyepiece lens G5 be a negative meniscus lens with its convex surface facing toward the secondary-image plane. The use of a negative meniscus lens with its convex surface facing toward the secondary-image plane as the negative second eyepiece lens G5 makes it possible to suppress the variation of aberration during dioptric power adjustment.

An eyepiece for a viewfinder needs to be so constructed that light from the entire field of view reaches the pupil of an observer (located at the position of the design pupil E) without being eclipsed. In a construction where an inverting optical system consists of a first, a second, and a third relay lens G1 to G3, a light beam is restricted by an aperture diaphragm A disposed within the first to third relay lenses G1 to G3, as shown in FIGS. 1A, 1B, and 1C to 7A, 7B, and 7C. Accordingly, the exit pupil of the first to third relay lenses G1 to G3 coincides with the entrance pupil of the entire eyepiece system G4 to G6, or G4 and G5. Moreover, the exit pupil of the entire eyepiece system G4 to G6, or G4 and G5, coincides with the design pupil E (the pupil of an observer). Therefore, much attention needs to be paid to the conjugate relationship between the pupils. However, in general, as the magnification of the viewfinder becomes higher, the difference between the axial pupil position (for a light beam from the center of the field of view) and the off-axial pupil position (for a light beam from the periphery of the field of view) becomes greater (generally called the spherical aberration of the pupil). This difference in the pupil positions inconveniently causes the central region of the field of view to appear bright but the peripheral region of the field of view to appear dim and shadowed.

To eliminate the above difference in the pupil positions, it is desirable that, as in the first to seventh embodiments, the first eyepiece lens G4 is provided with at least one aspherical surface. The use of at least one aspherical surface in the first eyepiece lens G4, which also functions as a condenser lens, permits the entrance pupil to match with the exit pupil (which usually is the pupil of an observer). Thus, it is possible to suppress the spherical aberration of the pupil.

Next, the relationship between the viewfinder magnification and dioptric power adjustment will be described. The viewfinder magnification is approximately defined by formula (A) below. In cases where there is a relay lens between the objective lens and the eyepiece, the viewfinder magnification is generally defined by formula (B) below.

$$\begin{pmatrix} \text{viewfinder} \\ \text{magnification} \end{pmatrix} = \begin{pmatrix} \text{focal length} \\ \text{of objective} \\ \text{lens} \end{pmatrix} / \begin{pmatrix} \text{focal} \\ \text{length of} \\ \text{eyepiece} \end{pmatrix} \quad (A)$$

$$\begin{pmatrix} \text{viewfinder} \\ \text{magnification} \end{pmatrix} = \begin{pmatrix} \text{focal length} \\ \text{of objective} \\ \text{lens} \end{pmatrix} \times \begin{pmatrix} \text{relay} \\ \text{magnification} \end{pmatrix} / \begin{pmatrix} \text{focal} \\ \text{length of} \\ \text{eyepiece} \end{pmatrix} \quad (B)$$

Formulae (A) and (B) show that, in order to keep the viewfinder magnification constant during dioptric power adjustment, it is necessary to suppress variation in the focal length of the eyepiece. In the third to fifth embodiments, the first to third eyepiece lenses G4 to G6 are designed to have a positive, a negative, and a positive power, respectively. Accordingly, even when the negative second eyepiece lens G5 is moved for dioptric power adjustment, the focal length of the entire eyepiece system G4 to G6 varies little during dioptric power adjustment. As the variation in the focal length of the entire eyepiece system G4 to G6 during dioptric power adjustment is smaller, so is the variation in the viewfinder magnification during dioptric power adjustment. Therefore, since dioptric power adjustment can be done without much affecting the viewfinder magnification, it is possible to remove the unnaturalness accompanying the variation in the viewfinder magnification.

Hereinafter, in connection with the constructions of viewfinder optical systems employing eyepieces embodying the present invention, the above-described eyepieces of the first to seventh embodiments of the present invention will be presented more specifically, with their construction data at a dioptric power of −1 diopter, aspherical surface data, aberration diagrams, and other data.

Tables 1 to 3 represent the construction data of the first, second, and third embodiments, respectively. Table 4 represents the construction data of the fourth and fifth embodiments. Table 5 represents the construction data of the sixth and seventh embodiments. In each table, Si (i=0, 1, 2, 3, . . . ) represents the i-th surface from the focal plane SO. In the construction data of each embodiment are listed the curvature radius of the surface Si, the axial distance between the surfaces Si and Si+1, the radius of the i-th lens from the focal plane SO (or the radius of the pupil E), the refractive index (Ne) for e-lines of the i-th lens from the focal plane SO, the Abbe number (vd) for d-lines of the i-th lens from the focal plane S0, and the name of each optical element or other.

Moreover, a surface Si marked with an asterisk (*) is an aspherical surface. The shape of an aspherical surface is defined by formula (C) below:

$$X = C \cdot Y^2 / \{1 + (1 - \epsilon \cdot C^2 \cdot Y^2)^{1/2}\} + A4 \cdot Y^4 + A6 \cdot Y^6 + A8 \cdot Y^8 \quad (C)$$

where

X: displacement from the reference surface of the optical axis;

Y: height in the direction perpendicular to the optical axis;

C: paraxial curvature;

ε: quadric surface parameter;

A4, A6, A8: aspherical coefficients of the fourth, sixth, and eighth orders.

Table 6 lists the variable distances (the S8–S9 and S10–S11 distances), the dioptric power, and the viewfinder magnification of the first and second embodiments at three different dioptric powers, i.e. with the first eyepiece lens G4 at different positions as shown in FIGS. 1A to 1C, and 2A to 2C. Table 7 lists the focal lengths of the eyepiece lenses and the relay magnification of the first and second embodiments at three different dioptric powers, i.e. with the first eyepiece lens G4 at different positions as shown in FIGS. 1A to 1C, and 2A to 2C; for the first embodiment, the focal length (f1) of the first eyepiece lens G4, the composite focal length (f2) of the second and third eyepiece lenses G5 and G6, and the focal length of the entire eyepiece system G4 to G6 are given; for the second embodiment, the focal length (f1) of the first eyepiece lens G4, the focal length (f2) of the second eyepiece lens G5, and the focal length of the entire eyepiece system G4 and G5 are given.

Table 8 lists the variable distances (the S10–S11 and S12–S13 distances), the dioptric power, and the viewfinder magnification of the third, fourth, and sixth embodiments at three different dioptric powers, i.e. with the second eyepiece lens G5 at different positions as shown in FIGS. 3A to 3C, 4A to 4C, and 6A to 6C. Table 9 below lists the variable distances (the S12–S13 and S14–S15 distances), the dioptric power, and the viewfinder magnification of the fifth and seventh embodiments at three different dioptric powers, i.e. with the third eyepiece lens G6 at different positions as shown in FIGS. 5A to 5C, and 7A to 7C.

Table 10 lists the focal lengths of the eyepiece lenses of the third, fourth, and sixth embodiments at three different dioptric powers, i.e. with the first eyepiece lens G4 at different positions as shown in FIGS. 3A to 3C, 4A to 4C, and 6A to 6C. Table 11 below lists the focal lengths of the eyepiece lenses of the fifth and seventh embodiments at three different dioptric powers, i.e. with the first eyepiece lens G4 at different positions as shown in FIGS. 5A to 5C, and 7A to 7C. For the third, fourth, and sixth embodiments, the focal length (f1) of the first eyepiece lens G4, the focal length (f2+) of the third eyepiece lens G6, the composite focal length (f2) of the second and third eyepiece lenses G5 and G6, and the focal length of the entire eyepiece system G4 to G6 are given; for the fifth and seventh embodiments, the focal length (f1) of the first eyepiece lens G4, the focal length (f2+) of the second eyepiece lens G5, the composite focal length (f2) of the second and third eyepiece lenses G5 and G6, and the focal length of the entire eyepiece system G4 to G6 are given. Furthermore, Table 12 below lists the relay magnification of the viewfinder optical system of the third to seventh embodiment.

TABLE 1

| | | | << Embodiment 1 >> | | | |
|---|---|---|---|---|---|---|
| | | | <Construction Data> | | | |
| Surface | Curvature Radius | Axial Distance | Lens Radius | Refractive Index | Abbe Number | Name |
| S0 | ∞ | 46.8 | | | | Focal Plane I1 |
| S1 | 7.811 | 3.4 | 5 | 1.716 | 53.94 | 1st Relay Lens G1 |

TABLE 1-continued

<< Embodiment 1 >>

| Surface | Curvature Radius | Axial Distance | Lens Radius | Refractive Index | Abbe Number | Name |
|---|---|---|---|---|---|---|
| S2 | −30.333 | 0.8 | | | | |
| S3* | −10.315 | 1.0 | 5 | 1.588 | 30.36 | 2nd Relay Lens G2 |
| S4 | 5.498 | 0.8 | | | | |
| S5 | ∞ | 3.4 | 2.6 | | | Aperture Diaphragm A |
| S6 | 32.114 | 2.8 | 5.1 | 1.716 | 53.94 | 3rd Relay Lens G3 |
| S7 | −10.085 | 18.259 | | | | |
| S8 | ∞ | 9.141 | | | | Secondary-image plane I2 |
| S9 | 16.952 | 6.8 | 11.2 | 1.527 | 56.38 | 1st Eyepiece Lens G4 |
| S10* | −17.045 | 9.002 | | | | |
| S11 | 91.881 | 1.0 | 9.5 | 1.843 | 21.00 | 2nd Eyepiece Lens G5 |
| S12 | 19.106 | 4.4 | | | | |
| S13 | 25.007 | 3.8 | 9.5 | 1.716 | 53.94 | 3rd Eyepiece Lens G6 |
| S14 | −47.427 | 15.0 | | | | |
| S15 | ∞ | | 3.3 (Pupil Radius) | | | Pupil E |

<Aspherical Surface Data>

S3: $\epsilon = -0.600$, $A4 = -2.70 \times 10^{-4}$, $A6 = 1.32 \times 10^{-5}$
S10: $\epsilon = -0.900$, $A4 = 6.10 \times 10^{-5}$, $A6 = 1.20 \times 10^{-7}$

TABLE 2

<< Embodiment 2 >>

<Construction Data>

| Surface | Curvature Radius | Axial Distance | Lens Radius | Refractive Index | Abbe Number | Name |
|---|---|---|---|---|---|---|
| S0 | ∞ | 48.2 | | | | Focal Plane I1 |
| S1 | 11.196 | 2.8 | 5 | 1.493 | 57.82 | 1st Relay Lens G1 |
| S2 | −13.333 | 0.4 | | | | |
| S3* | −12.915 | 1.0 | 4.3 | 1.626 | 24.01 | 2nd Relay Lens G2 |
| S4 | 11.413 | 1.6 | | | | |
| S5 | ∞ | 5.4 | 3 | | | Aperture Diaphragm A |
| S6 | 20.221 | 3.8 | 6.6 | 1.527 | 56.38 | 3rd Relay Lens G3 |
| S7* | −9.898 | 20.844 | | | | |
| S8 | ∞ | 7.763 | | | | Secondary-image plane I2 |
| S9* | 23.984 | 3.5 | 10 | 1.493 | 57.82 | 1st Eyepiece Lens G4 |
| S10 | −28.571 | 10.952 | | | | |
| S11* | 31.844 | 3.7 | 10 | 1.493 | 57.82 | 2nd Eyepiece Lens G5 |
| S12 | −22.954 | 18.0 | | | | |
| S13 | ∞ | | 3.3 (Pupil Radius) | | | Pupil E |

<Aspherical Surface Data>

S3: $\epsilon = 1.908$, $A4 = -2.19 \times 10^{-4}$, $A6 = 5.37 \times 10^{-6}$
S7: $\epsilon = 1.123$, $A4 = 1.73 \times 10^{-4}$, $A6 = 1.99 \times 10^{-6}$, $A8 = -5.67 \times 10^{-10}$
S9: $\epsilon = -10.989$
S11: $\epsilon = -34.683$, $A4 = 7.11 \times 10^{-5}$, $A6 = -6.29 \times 10^{-7}$, $A8 = 1.61 \times 10^{-9}$

TABLE 3

<< Embodiment 3 >>

<Construction Data>

| Surface | Curvature Radius | Axial Distance | Lens Radius | Refractive Index | Abbe Number | Name |
|---|---|---|---|---|---|---|
| S0 | ∞ | 48.2 | | | | Focal Plane I1 |
| S1 | 8.367 | 3.2 | 5 | 1.700 | 56.47 | 1st Relay Lens G1 |

TABLE 3-continued

<< Embodiment 3 >>

| Surface | Curvature Radius | Axial Distance | Lens Radius | Refractive Index | Abbe Number | Name |
|---|---|---|---|---|---|---|
| S2 | −76.191 | 1.3 | | | | |
| S3* | −11.922 | 1.0 | 5 | 1.588 | 30.36 | 2nd Relay Lens G2 |
| S4 | 6.470 | 3.6 | | | | |
| S5 | ∞ | 0.0 | 2.7 | | | Aperture Diaphragm A |
| S6 | 35.739 | 3.1 | 5.1 | 1.758 | 51.57 | 3rd Relay Lens G3 |
| S7 | −10.981 | 20.312 | | | | |
| S8 | ∞ | 7.188 | | | | Secondary-image plane I2 |
| S9 | 18.454 | 7.2 | 11.5 | 1.527 | 56.38 | 1st Eyepiece Lens G4 |
| S10* | −15.463 | 11.000 | | | | |
| S11 | 111.686 | 1.0 | 9.5 | 1.843 | 21.00 | 2nd Eyepiece Lens G5 |
| S12 | 19.943 | 3.3 | | | | |
| S13 | 31.126 | 3.8 | 9.5 | 1.758 | 51.57 | 3rd Eyepiece Lens G6 |
| S14 | −31.126 | 13.0 | | | | |
| S15 | ∞ | | 3.3 (Pupil Radius) | | | Pupil E |

<Aspherical Surface Data>

S3: $\epsilon = 1.000$, $A4 = -1.45 \times 10^{-4}$, $A6 = 1.11 \times 10^{-5}$
S10: $\epsilon = 1.000$, $A4 = 9.70 \times 10^{-5}$, $A6 = 2.73 \times 10^{-7}$

TABLE 4

<< Embodiment 4 and 5 >>

<Construction Data>

| Surface | Curvature Radius | Axial Distance | Lens Radius | Refractive Index | Abbe Number | Name |
|---|---|---|---|---|---|---|
| S0 | ∞ | 46.8 | | | | Focal Plane I1 |
| S1 | 7.811 | 3.4 | 5 | 1.716 | 53.94 | 1st Relay Lens G1 |
| S2 | −30.333 | 0.8 | | | | |
| S3* | −10.315 | 1.0 | 5 | 1.588 | 30.36 | 2nd Relay Lens G2 |
| S4 | 5.498 | 0.8 | | | | |
| S5 | ∞ | 3.4 | 2.6 | | | Aperture Diaphragm A |
| S6 | 32.114 | 2.8 | 5.1 | 1.716 | 53.94 | 3rd Relay Lens G3 |
| S7 | −10.085 | 18.259 | | | | |
| S8 | ∞ | 9.141 | | | | Secondary-image plane I2 |
| S9 | 16.952 | 6.8 | 11.2 | 1.527 | 56.38 | 1st Eyepiece Lens G4 |
| S10* | −17.045 | 9.002 | | | | |
| S11 | 91.881 | 1.0 | 9.5 | 1.843 | 21.00 | 2nd Eyepiece Lens G5 |
| S12 | 19.106 | 4.4 | | | | |
| S13 | 25.007 | 3.8 | 9.5 | 1.716 | 53.94 | 3rd Eyepiece Lens G6 |
| S14 | −47.427 | 15.0 | | | | |
| S15 | ∞ | | 3.3 (Pupil Radius) | | | Pupil E |

<Aspherical Surface Data>

S3: $\epsilon = -0.600$, $A4 = -2.70 \times 10^{-4}$, $A6 = 1.32 \times 10^{-5}$
S10: $\epsilon = -0.900$, $A4 = 6.10 \times 10^{-5}$, $A6 = 1.20 \times 10^{-7}$

TABLE 5

<< Embodiment 6 and 7 >>

<Construction Data>

| Surface | Curvature Radius | Axial Distance | Lens Radius | Refractive Index | Abbe Number | Name |
|---|---|---|---|---|---|---|
| S0 | ∞ | 48.2 | | | | Focal Plane I1 |
| S1 | 11.1959 | 2.8 | 5 | 1.493 | 57.82 | 1st Relay Lens G1 |

TABLE 5-continued

<< Embodiment 6 and 7 >>

| | | | | | | |
|---|---|---|---|---|---|---|
| S2 | −13.3333 | 0.4 | | | | |
| S3* | −12.915 | 1 | 4.3 | 1.626 | 24.01 | 2nd Relay Lens G2 |
| S4 | 11.4129 | 1.6 | | | | |
| S5 | ∞ | 5.4 | 2.9 | | | Aperture Diaphragm A |
| S6 | 20.2211 | 3.8 | 6.6 | 1.527 | 56.38 | 3rd Relay Lens G3 |
| S7* | −9.898 | 20.8438 | | | | |
| S8 | ∞ | 16.1543 | | | | Secondary-image plane I2 |
| S9* | 25.000 | 6 | 11 | 1.527 | 56.38 | 1st Eyepiece Lens G4 |
| S10 | −28.5714 | 6.80051 | | | | |
| S11* | 48.662 | 3.8 | 11 | 1.716 | 53.94 | 2nd Eyepiece Lens G5 |
| S12 | −26.3797 | 2.8319 | | | | |
| S13* | −21.182 | 1 | 9.5 | 1.757 | 24.14 | 3rd Eyepiece Lens G6 |
| S14 | −134.573 | 15 | | | | |
| S15 | ∞ | | 3.3 (Pupil Radius) | | | Pupil E |

<Aspherical Surface Data>

S3: $\epsilon = -1.908$, $A4 = -2.19 \times 10^{-4}$, $A6 = 5.37 \times 10^{-6}$
S7: $\epsilon = 1.123$, $A4 = 1.73 \times 10^{-4}$, $A6 = 1.99 \times 10^{-6}$, $A8 = -5.67 \times 10^{-10}$
S9: $\epsilon = -0.727$
S11: $\epsilon = -84.865$, $A4 = 3.91 \times 10^{-5}$, $A6 = 6.06 \times 10^{-7}$, $A8 = 1.21 \times 10^{-9}$
S13: $\epsilon = -1.619$, $A4 = -1.12 \times 10^{-5}$, $A6 = 2.29 \times 10^{-7}$, $A8 = -5.53 \times 10^{-11}$

TABLE 6

<< With First Eyepiece Lens G4 Movable >>

| | Movement Distance (mm) | S8–S9 Distance (mm) | S10–S11 Distance (mm) | Dioptric power [FIG. No.] | Viewfinder Magnification |
|---|---|---|---|---|---|
| Emb. 1 | −1.5 | 7.641 | 10.500 | −3.881 [FIG. 1A] | −2.400 |
| | 0 | 9.141 | 9.000 | −1.000 [FIG. 1B] | −2.603 |
| | 1.5 | 10.641 | 7.500 | 2.598 [FIG. 1C] | −2.808 |
| Emb. 2 | −2 | 5.763 | 12.950 | −3.702 [FIG. 2A] | −2.303 |
| | 0 | 7.763 | 10.950 | −1.000 [FIG. 2B] | −2.499 |
| | 2 | 9.763 | 8.950 | 2.824 [FIG. 2C] | −2.716 |

TABLE 7

<<Focal Length of Eyepiece Lenses, and Relay Magnification>>

| | Eyepiece Lens | Dioptric power [Figure. No.] | Focal Length of Eyepiece Lens | Relay Magnification |
|---|---|---|---|---|
| Emb. 1 | G4 | at any dioptric power [FIGS. 1A to 1C] | f1 = 17.31 | −0.418 |
| | G5–G6 | at any dioptric power [FIGS. 1A to 1C] | f2 = 64.33 | |
| | G4–G6 | −1 [FIG. 1B] | 20.00 | |
| Emb. 2 | G4 | at any dioptric power [FIGS. 2A to 2C] | f1 = 27.03 | −0.36 |
| | G5 | at any dioptric power [FIGS. 2A to 2C] | f2 = 27.66 | |
| | G4–G5 | −1 [FIG. 2B] | 18.25 | |

TABLE 8

<< With Second Eyepiece Lens G5 Movable >>

Figure 5A:
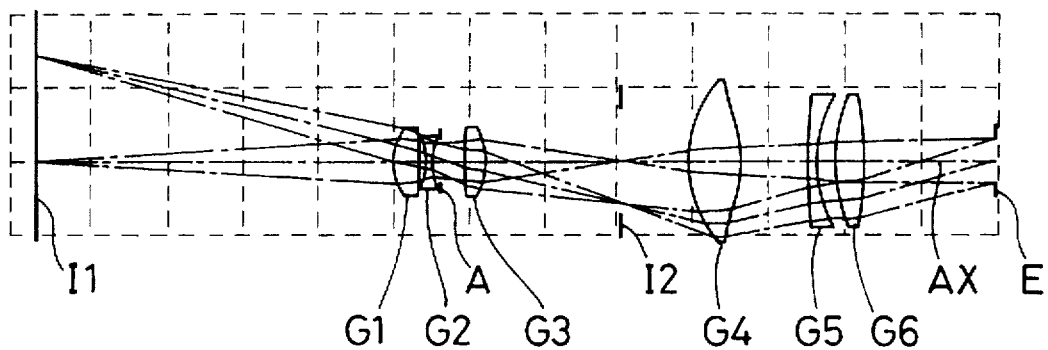
FIGS. 5A to 5C are optical path diagrams of a viewfinder optical system provided with an eyepiece of a fifth embodiment of the present invention.
Figure 5B:
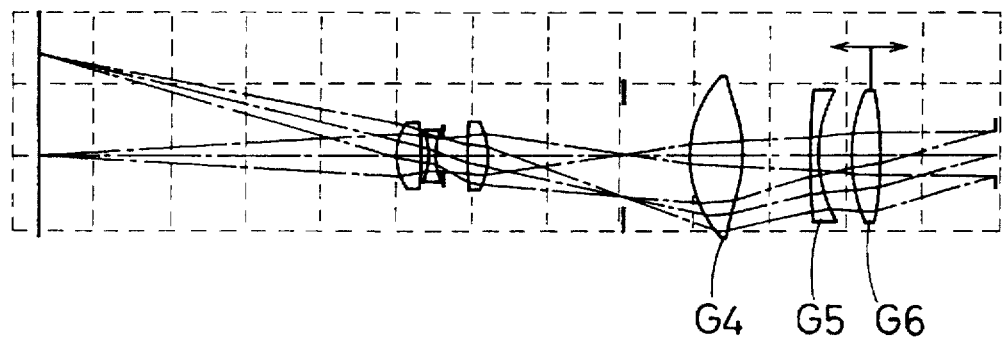
Figure 5C:
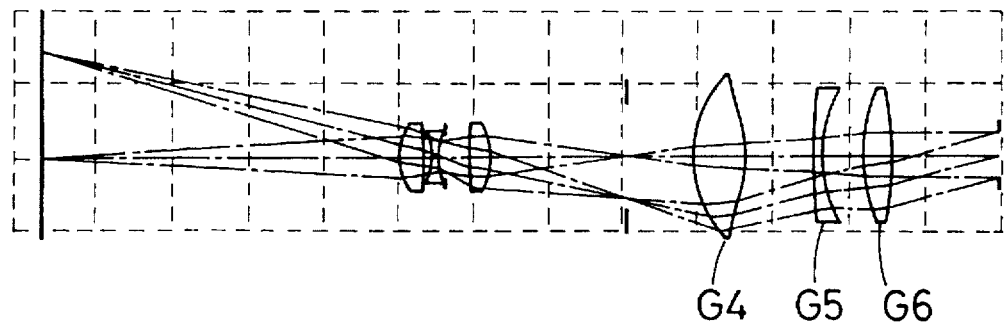
Figure 6A:
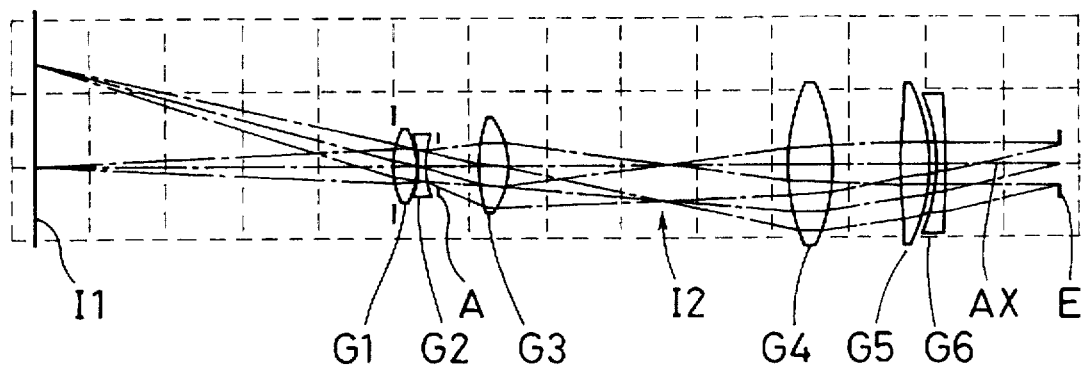
FIGS. 6A to 6C are optical path diagrams of a viewfinder optical system provided with an eyepiece of a sixth embodiment of the present invention.
Figure 6B:
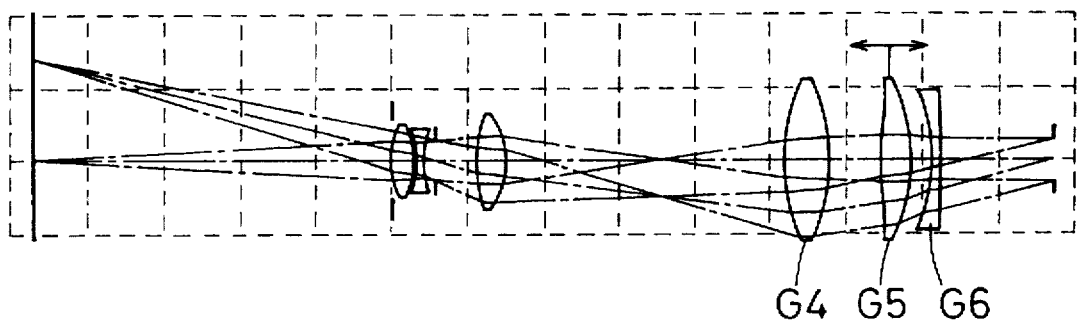
Figure 6C:
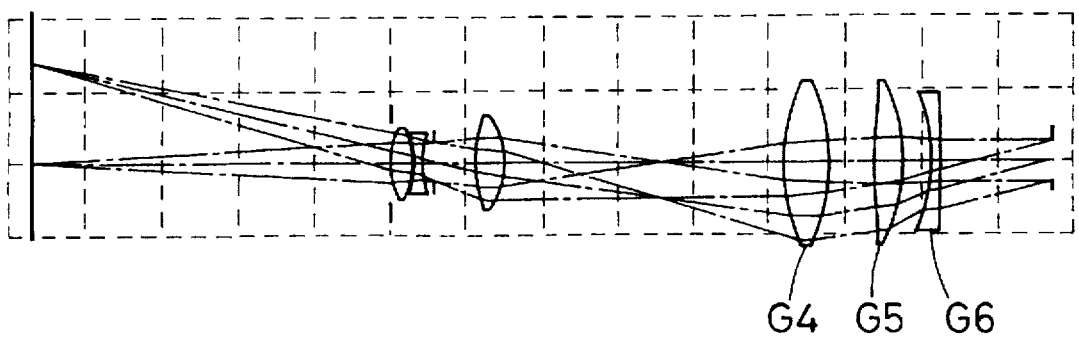

| | Movement Distance (mm) | S10–S11 Distance (mm) | S12–S13 Distance (mm) | Dioptric power [FIG. No.] | Viewfinder Magnification |
|---|---|---|---|---|---|
| Emb. 3 | −1.5 | 12.500 | 1.800 | −3.842 [FIG. 5A] | −2.808 |
| | 0 | 11.000 | 3.300 | [−1.000] [FIG. 5B] | [−2.816] |
| | 1.5 | 9.500 | 4.800 | 1.706 [FIG. 5C] | −2.827 |
| Emb. 4 | [−3] | 12.000 | 1.400 | −5.947 [FIG. 6A] | −2.588 |
| | 0 | 9.000 | 4.400 | −1.000 [FIG. 6B] | −2.603 |
| | 3 | 6.000 | 7.400 | 3.572 [FIG. 6C] | −2.626 |
| Emb. 6 | 2 | 8.801 | 0.843 | −2.079 [FIG. 8A] | −2.243 |
| | 0 | 6.801 | 2.843 | [−1.000] [FIG. 8B] | −2.483 |
| | [−1] | 5.801 | 3.843 | −0.430 [FIG. 8C] | −2.616 |

TABLE 9

<< With Third Eyepiece Lens G6 Movable >>

Figure 7A:
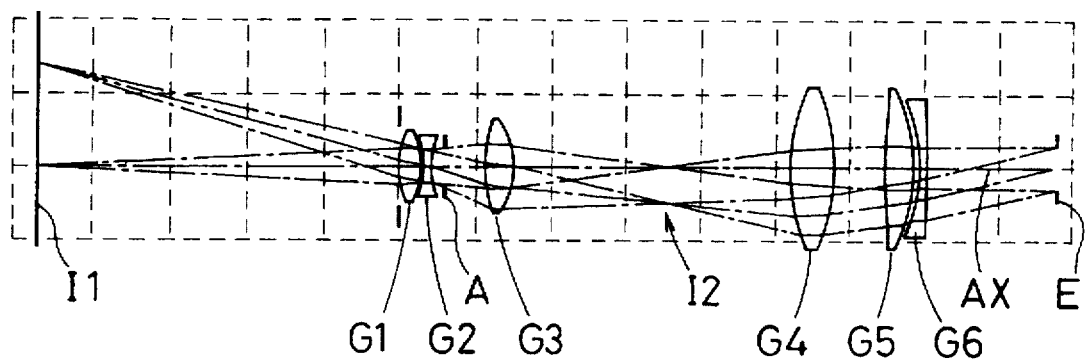
FIGS. 7A to 7C are optical path diagrams of a viewfinder optical system provided with an eyepiece of a seventh embodiment of the present invention.
Figure 7B:
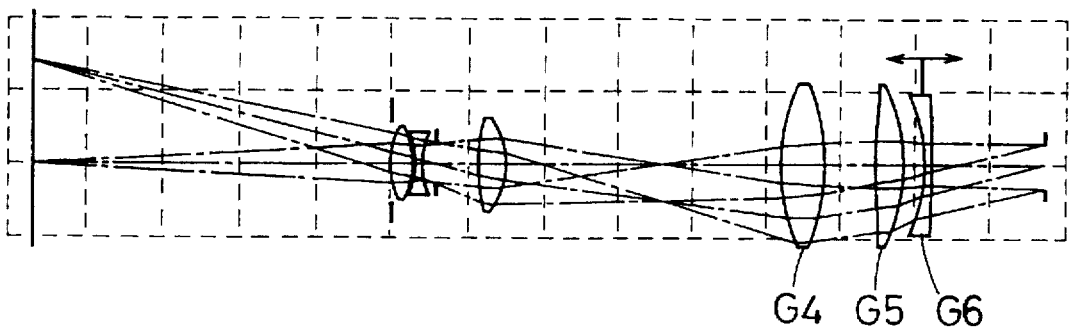
Figure 7C:
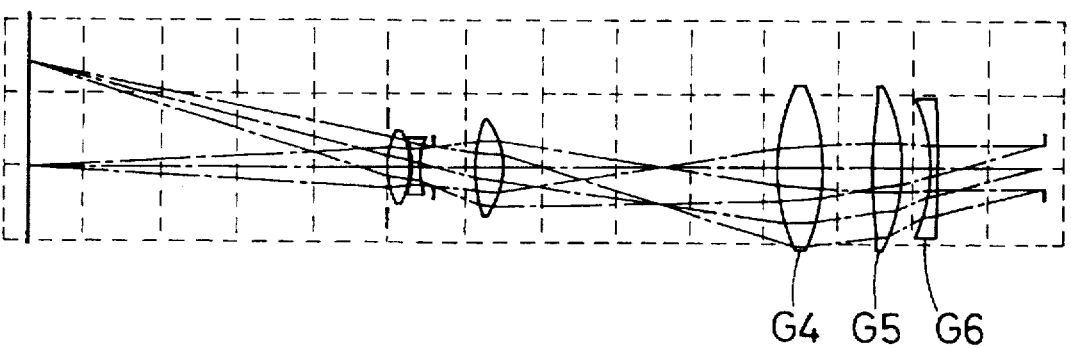
Figure 10A:
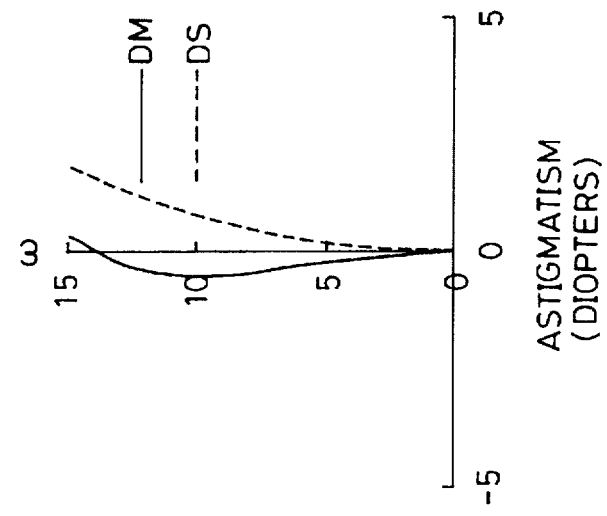
Figure 10B:
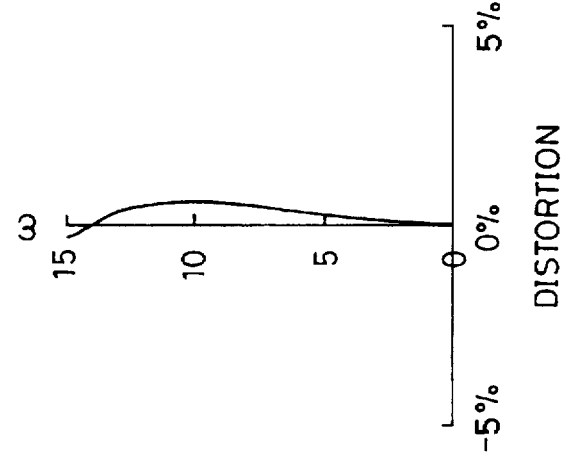
Figure 10C:
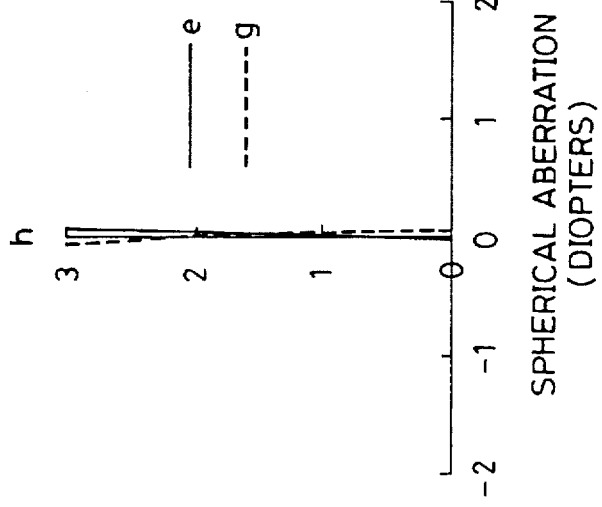
Figure 10F:
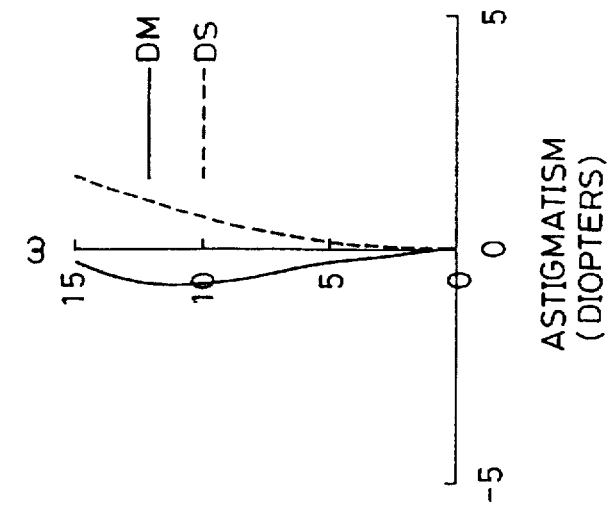
Figure 10E:
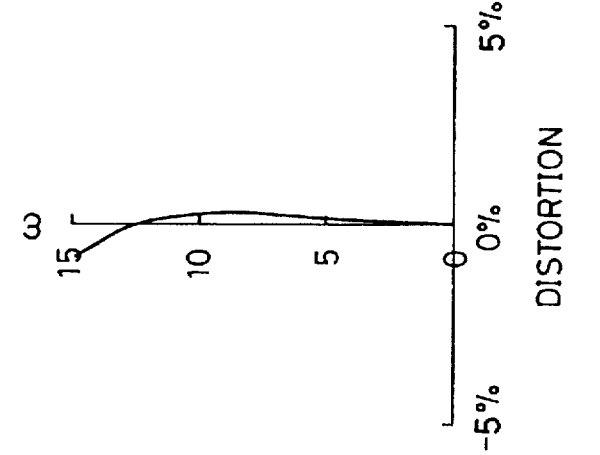
Figure 10D:
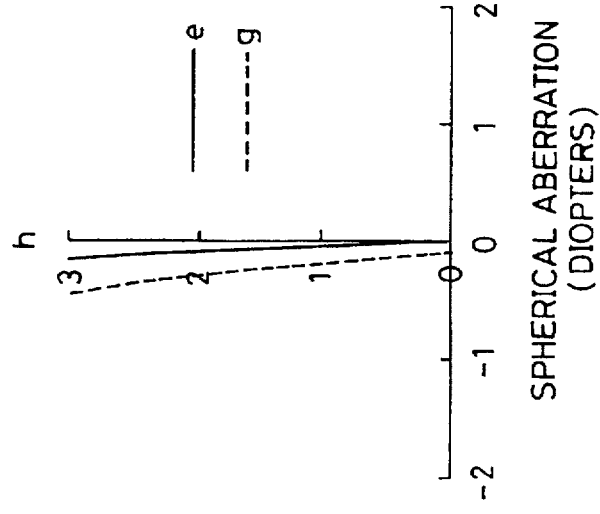
Figure 11A:
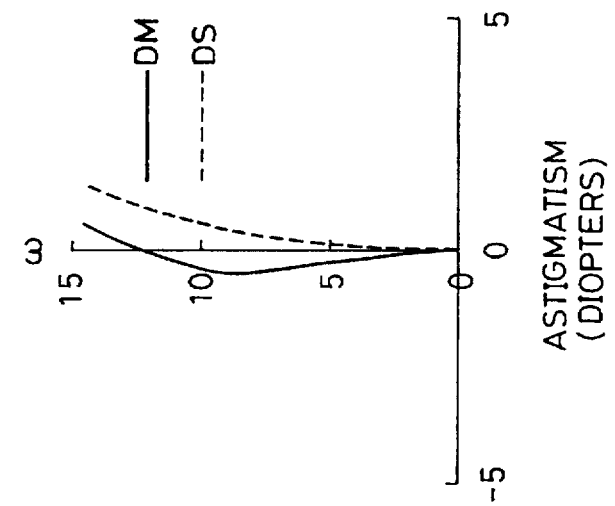
FIGS. 11A to 11I are aberration diagrams of the fourth embodiment.
Figure 11B:
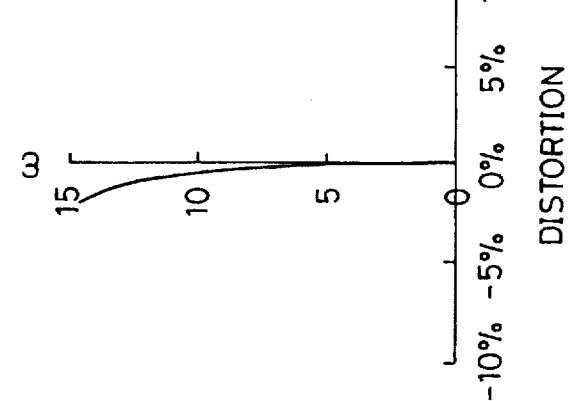
Figure 11C:
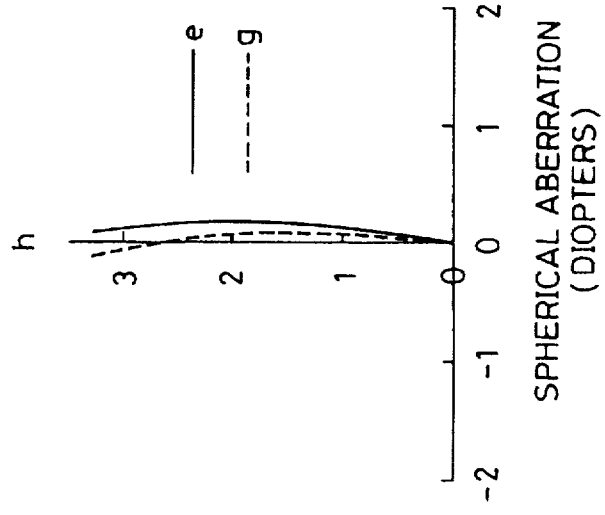
Figure 11F:
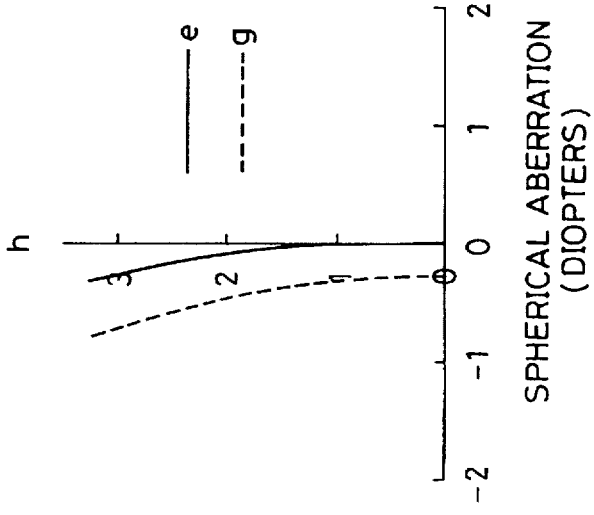
Figure 11E:
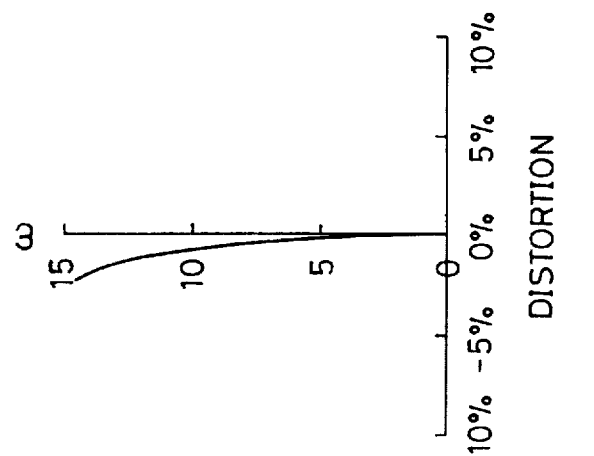
Figure 11D:
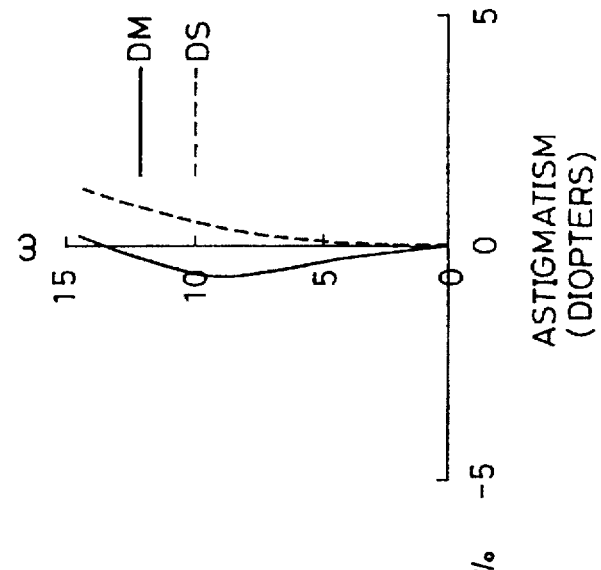
Figure 11I:
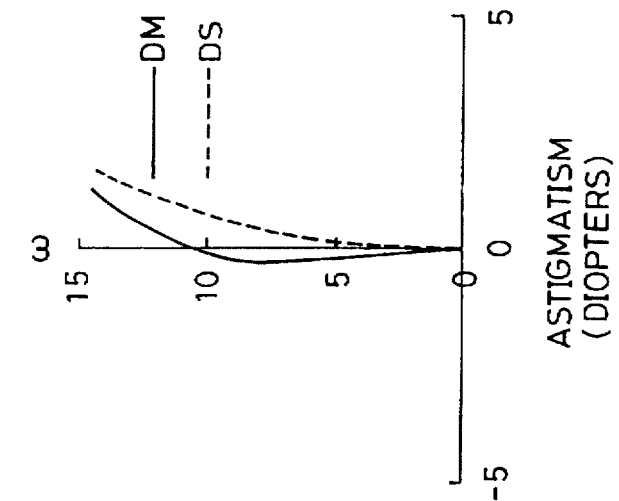
Figure 11H:
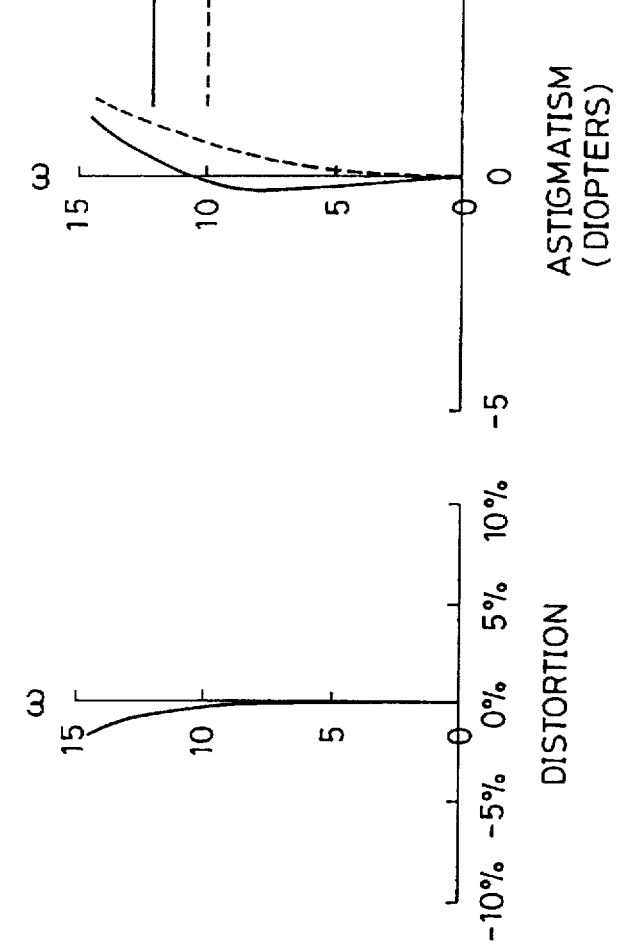
Figure 11G:
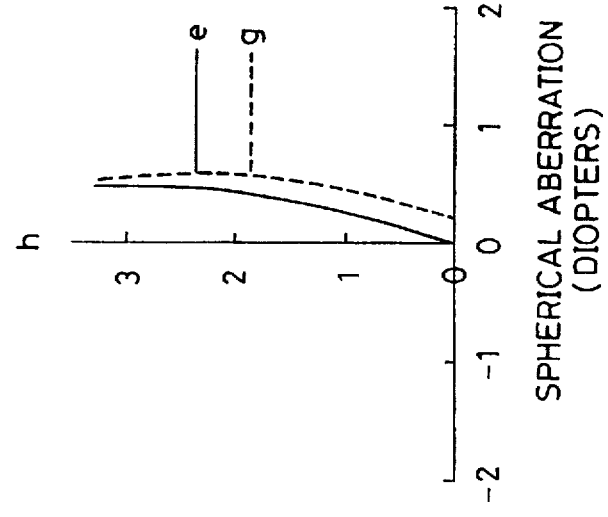
Figure 12I:
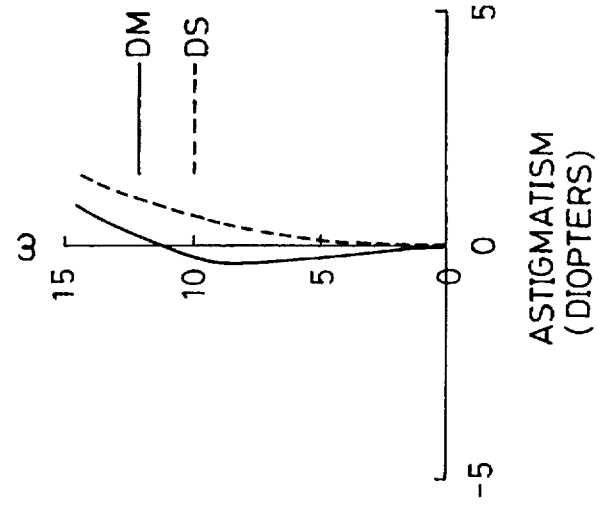
Figure 12H:
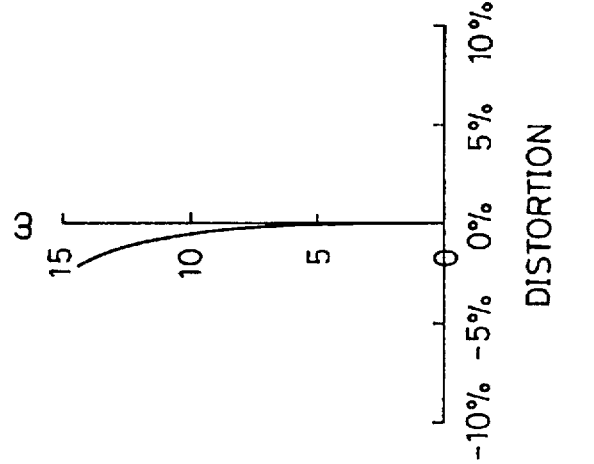
Figure 12G:
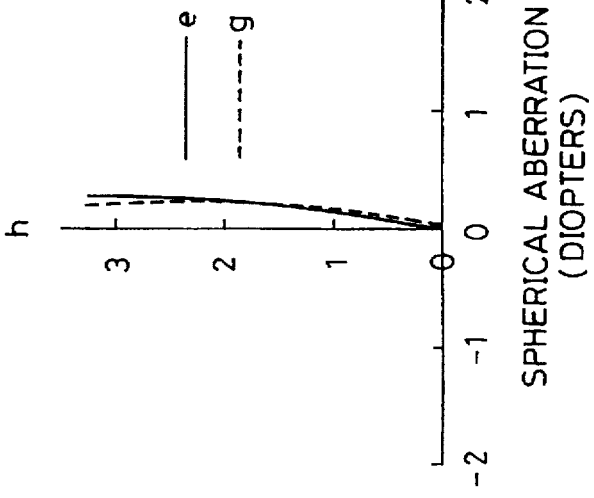
Figures 13G, 13H, 13I:
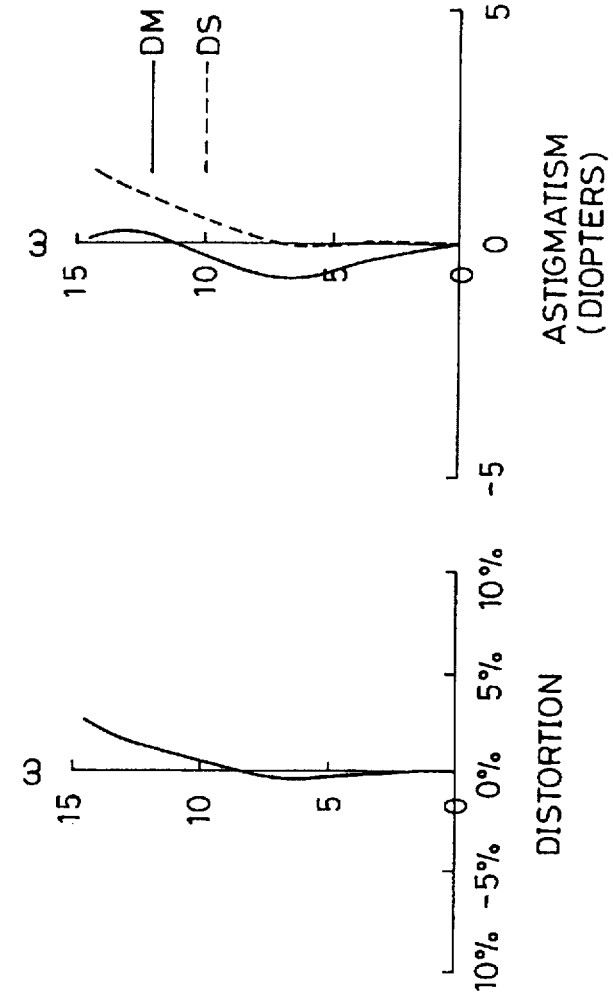
Figure 14D:
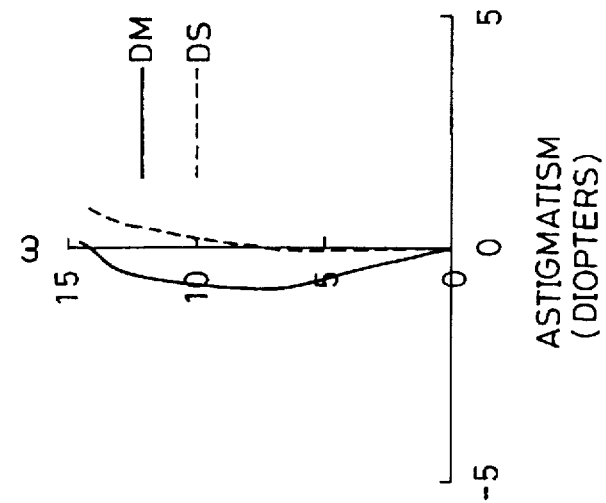
Figure 14E:
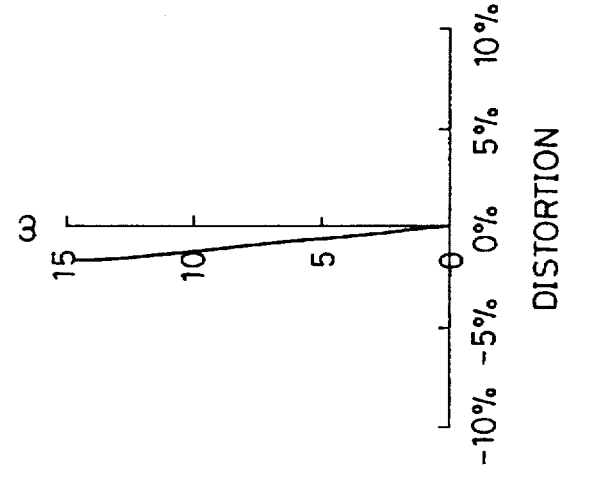
Figure 14F:
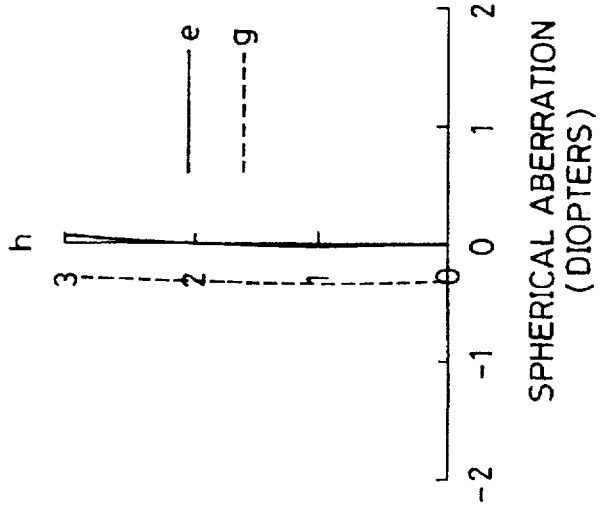
Figures 14G, 14H, 14I:
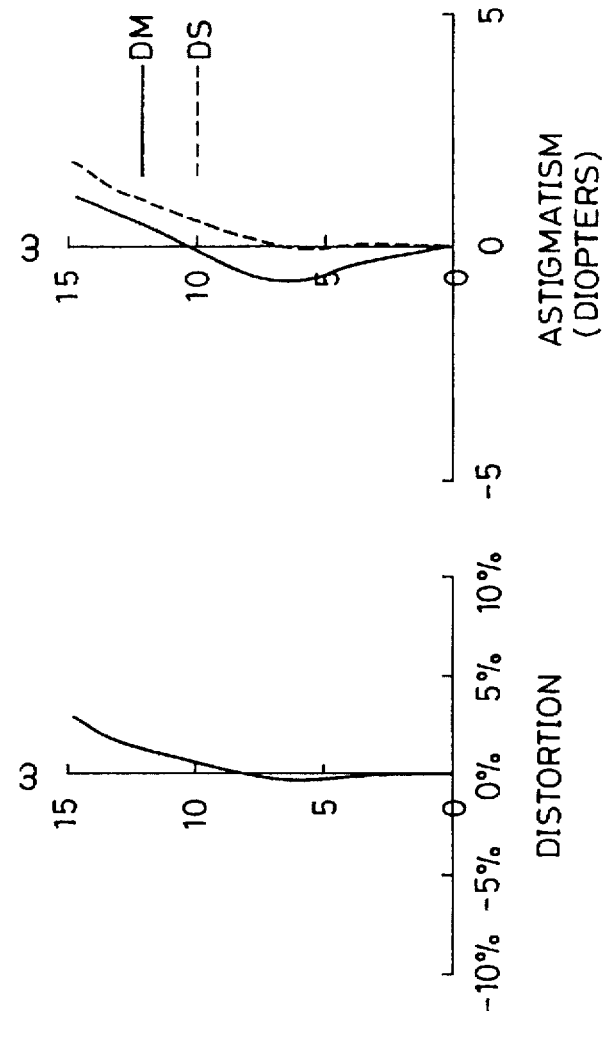

| | Movement Distance (mm) | S12–S13 Distance (mm) | S14–S15 Distance (mm) | Dioptric power [FIG. No.] | Viewfinder Magnification |
|---|---|---|---|---|---|
| Emb. 5 | −2 | 2.400 | 17.000 | −4.762 [FIG. 7A] | −2.646 |
| | 0 | 4.400 | 15.000 | −1.000 [FIG. 7B] | −2.603 |
| | 1 | 5.400 | 14.000 | 0.832 [FIG. 7C] | −2.569 |
| Emb. 7 | −2 | 0.843 | 17.000 | −2.489 [FIG. 9A] | −2.280 |

TABLE 9-continued

<< With Third Eyepiece Lens G6 Movable >>

| Movement Distance (mm) | S12–S13 Distance (mm) | S14–S15 Distance (mm) | Dioptric power [FIG. No.] | Viewfinder Magnification |
|---|---|---|---|---|
| 0 | 2.843 | 15.000 | −1.000 [FIG. 9B] | −2.483 |
| 1 | 3.843 | 14.000 | −0.150 [FIG. 9C] | −2.593 |

TABLE 10

<< Focal Length of Eyepiece Lenses (G5 Movable) >>

| | Eyepiece Lens | Dioptric power [Figure. No.] | Focal Length of Eyepiece Lens |
|---|---|---|---|
| Emb. 3 | G4 | at any dioptric power [FIGS. 5A to 5C] | f1 = 17.22 |
| | G6 | at any dioptric power [FIGS. 5A to 5C] | f2+ = 21.09 |
| | G5–G6 | −3.84 [FIG. 5A] | f2 = 57.30 |
| | | −1 [FIG. 5B] | f2 = 50.23 |
| | | 1.71 [FIG. 5C] | f2 = 44.71 |
| | G4–G6 | −1 [FIG. 5B] | 20.00 |
| Emb. 4 | G4 | at any dioptric power [FIGS. 6A to 6C] | f1 = 17.31 |
| | G6 | at any dioptric power [FIGS. 6A to 6C] | f2+ = 23.38 |
| | G5–G6 | −5.95 [FIG. 6A] | f2 = 90.19 |
| | | −1 [FIG. 6B] | f2 = 64.33 |
| | | 3.57 [FIG. 6C] | f2 = 50.00 |
| | G4–G6 | −1 [FIG. 6B] | 20.00 |
| Emb. 6 | G4 | at any dioptric power [FIGS. 8A to 8C] | f1 = 26.30 |
| | G5–G6 | −2.08 [FIG. 8A] | f2 = 77.74 |
| | | −1 [FIG. 8B] | f2 = 65.27 |
| | | −0.43 [FIG. 8C] | f2 = 60.42 |
| | G4–G6 | −1 [FIG. 8B] | 19.50 |

TABLE 11

<< Focal Length of Eyepiece Lenses (G6 Movable) >>

| | Eyepiece Lens | Dioptric power [Figure. No.] | Focal Length of Eyepiece Lens |
|---|---|---|---|
| Emb. 5 | G4 | at any dioptric power [FIGS. 7A to 7C] | f1 = 17.31 |
| | G5–G6 | −4.76 [FIG. 7A] | f2 = 79.53 |
| | | −1 [FIG. 7B] | f2 = 64.33 |
| | | 0.83 [FIG. 7C] | f2 = 58.52 |
| | G4–G6 | −1 [FIG. 7B] | 20.00 |
| Emb. 7 | G4 | at any dioptric power [FIGS. 9A to 9C] | f1 = 26.30 |
| | G5–G6 | −2.49 [FIG. 9A] | f2 = 77.74 |
| | | −1 [FIG. 9B] | f2 = 65.27 |
| | | −0.15 [FIG. 9C] | f2 = 60.42 |
| | G4–G6 | −1 [FIG. 9B] | 19.50 |

TABLE 12

<< Relay Magnification >>

| | Relay Magnification |
|---|---|
| Embodiment 3 | −0.45 |
| Embodiment 4 | −0.418 |
| Embodiment 5 | −0.418 |
| Embodiment 6 | −0.36 |
| Embodiment 7 | −0.36 |

FIGS. 8A–8I to 14A–14I are aberration diagrams corresponding to the first to seventh embodiments, respectively, and illustrate three types of aberration in each embodiment at three different dioptric powers. Specifically, FIGS. 8A, 8D, and 8G to 14A, 14D, and 14G show spherical aberration; FIGS. 8B, 8E, and 8H to 14B, 14E, and 14H show distortion; and FIGS. 8C, 8F, and 8I to 14C, 14F, and 14I show astigmatism. FIG. 8A, 8B, and 8C to 14A, 14B, 14C correspond to the state shown in FIGS. 1A to 7A; FIG. 8D, 8E, and 8F to 14D, 14E, 14F correspond to the state shown in FIGS. 1B to 7B; and FIG. 8G, 8H, and 8I to 14G, 14H, 14I correspond to the state shown in FIGS. 1C to 7C. In the aberration diagrams, a solid line (e) represents aberration for e-lines, and a broken line (g) represents aberration for g-lines. Moreover, a broken line (DM) and a solid line (DS) represent astigmatism on the meridional and sagittal planes, respectively. Note that h represents the radius of the pupil E, and ω represents half the angle of view.

As described above, according to the present invention, it is possible to realize an eyepiece that permits the dioptric power of a viewfinder to be adjusted in a wider range than ever and that allows easy designing of a dustproof, waterproof, and dripproof construction.

What is claimed is:

1. An eyepiece for use in a viewfinder optical system provided with a relay lens system, comprising, from a side of an image plane formed by the relay lens system:

a first lens unit having a positive refractive power and moved in an optical axis direction for dioptric power adjustment; and other lens units.

2. An eyepiece as claimed in claim 1, wherein the following condition is satisfied:

f1<f2 where f1: focal length of the first lens unit;

f2: composite focal length of lens units other than the first lens unit.

3. An eyepiece as claimed in claim 1, wherein said first lens unit is composed of a single first lens element having a positive refractive power.

4. An eyepiece as claimed in claim 1, wherein said first lens unit has at least one aspherical surface.

5. An eyepiece as claimed in claim 1, wherein lens units other than said first lens unit consist only of a second lens unit having a positive refractive power.

6. An eyepiece as claimed in claim 5, wherein said second lens unit is composed of a single second lens element having a positive refractive power.

7. An eyepiece as claimed in claim 5, wherein said second lens unit has at least one aspherical surface.

8. An eyepiece as claimed in claim 5,
wherein said second lens unit is composed of a single second lens element having a positive refractive power, and said second lens unit has at least one aspherical surface.

9. An eyepiece as claimed in claim 5,
wherein said second lens element is made of plastics.

10. An eyepiece as claimed in claim 1,
wherein lens units other than said first lens unit consist of a second lens unit having a negative refractive power and a third lens unit having a positive refractive power.

11. An eyepiece as claimed in claim 10,
wherein said second lens unit is composed of a single second lens element that is a negative meniscus lens with its convex surface facing toward an image plane formed by the relay lens system, and said third lens unit is composed of a single third lens element having a positive refractive power.

12. An eyepiece as claimed in claim 11,
wherein said third lens element of said third lens unit satisfy the following condition:

$$R31 < |R32|$$
$$R32 < 0$$

where
R31: curvature radius of an front-side surface of the third lens element;
R32: curvature radius of a rear-side surface of the third lens element.

13. An eyepiece as claimed in claim 1,
wherein lens units constituting said eyepiece other than said first lens unit are kept at rest during dioptric power adjustment.

14. An eyepiece for use in a viewfinder optical system provided with a relay lens system, comprising, from a side of an image plane formed by the relay lens system:
a first lens unit having a positive refractive power; and
a second lens unit of which part of lens units are moved in an optical axis direction for dioptric power adjustment.

15. An eyepiece as claimed in claim 14,
wherein the following condition is satisfied:
where
f1: focal length of the first lens unit;
f2: composite focal length of lens units other than the first lens unit.

16. An eyepiece as claimed in claim 14,
wherein said first lens unit is composed of a single first lens element having a positive refractive power.

17. An eyepiece as claimed in claim 14,
wherein said first lens unit has at least one aspherical surface.

18. An eyepiece as claimed in claim 14,
wherein said second lens unit comprises, from a side of an image plane formed by the relay lens system:
a first lens element having a negative refractive power; and
a second lens element having a positive refractive power, and
wherein said second lens element is moved in an optical axis direction for dioptric power adjustment.

19. An eyepiece as claimed in claim 18,
wherein the following condition is satisfied:

$$f1 < f2+$$

where
f1: focal length of the first lens unit;
f2+: focal length of the first lens element of the second lens unit.

20. An eyepiece as claimed in claim 18,
wherein said second lens element is a negative meniscus lens with its convex surface facing toward an image plane formed by the relay lens system.

21. An eyepiece as claimed in claim 18,
wherein said third lens element satisfies the following condition:

$$R31 < |R32|$$
$$R32 < 0$$

where
R31: curvature radius of an front-side surface of the third lens element;
R32: curvature radius of a rear-side surface of the third lens element.

22. An eyepiece as claimed in claim 14,
wherein said second lens unit comprises, from a side of an image plane formed by the relay lens system:
a first lens element having a negative refractive power; and
a second lens element having a positive refractive power, and
wherein said first lens element is moved in an optical axis direction for dioptric power adjustment.

23. An eyepiece as claimed in claim 22,
wherein said third lens element satisfies the following condition:

$$R31 < |R32|$$
$$R32 < 0$$

where
R31: curvature radius of an front-side surface of the third lens element;
R32: curvature radius of a rear-side surface of the third lens element.

24. An eyepiece as claimed in claim 14,
wherein said second lens unit comprises, from a side of an image plane formed by the relay lens system:
a first lens element having a positive refractive power; and
a second lens element having a negative refractive power, and
wherein said second lens element is moved in an optical axis direction for dioptric power adjustment.

25. An eyepiece as claimed in claim 14,
wherein said second lens unit comprises, from a side of an image plane formed by the relay lens system:
a first lens element having a positive refractive power; and
a second lens element having a negative refractive power, and
wherein said first lens element is moved in an optical axis direction for dioptric power adjustment.

26. An optical system for use in a viewfinder optical system comprising:

a relay lens system refocusing a primary image as a secondary image; and an eyepiece lens system comprising, from a side of a secondary image formed by the relay lens system:

a first lens unit having a positive refractive power and movable in an optical axis direction for dioptric power adjustment; and other lens units.

27. An optical system for use in a viewfinder optical system comprising:

a relay lens system refocusing a primary image as a secondary image; and an eyepiece lens system comprising, from a side of a secondary image plane formed by the relay lens system:

a first lens unit having a positive refractive power; and a second lens unit of which part of said first and second lens units are moved in an optical axis direction for dioptric power adjustment.

28. A viewfinder optical system comprising:

a relay lens system for imaging a primary image on a focal plane onto a secondary image plane; and an eyepiece lens system for realizing a secondary image formed on the secondary image plane to an exit pupil for viewing by the user, the eyepiece lens system includes, from the secondary image plane to the exit pupil, a first positive condenser lens, a negative second lens unit and a positive third lens unit, wherein the following condition is satisfied:

$$f_1 < f_2$$

where $f_1$ is the focal length of the first positive condenser lens and $f_2$ is the composite focal length of the second and third lens units.

29. The viewfinder optical system of claim 28, wherein the first positive condenser lens is moved to provide a dioptric power adjustment.

30. The viewfinder optical system of claim 29, wherein the first positive condenser lens is made from a high index refractive glass, including $L_aC_8$ and N61F.

31. The viewfinder optical system of claim 29, wherein the first positive condenser lens has at least one aspherical surface and is made from a plastic resin.

32. The viewfinder optical system of claim 31, wherein the refractive power of the first positive condenser lens is greater than the refractive power of the positive third lens unit.

33. The viewfinder optical system of claim 28, wherein the second lens unit is moved to provide a dioptric power adjustment.

34. The viewfinder optical system of claim 33, wherein the second lens unit has at least one aspherical surface and is made from a plastic resin.

35. The viewfinder optical system of claim 29, wherein the second and third lens units are stationary when the first positive condenser lens is moved.

* * * * *